(12) United States Patent
Bhattacharya et al.

(10) Patent No.: US 12,367,443 B2
(45) Date of Patent: Jul. 22, 2025

(54) SYSTEM AND METHOD FOR SHOWING KEY PERFORMANCE INDICATORS

(71) Applicant: Tyco Fire & Security GmbH, Neuhausen am Rheinfall (CH)

(72) Inventors: Subrata Bhattacharya, Navi Mumbai (IN); Tulshiram Waghmare, Pune (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 142 days.

(21) Appl. No.: 16/685,849

(22) Filed: Nov. 15, 2019

(65) Prior Publication Data

US 2020/0226525 A1    Jul. 16, 2020

Related U.S. Application Data

(60) Provisional application No. 62/792,347, filed on Jan. 14, 2019.

(51) Int. Cl.
  *G06Q 10/0639*  (2023.01)
  *G05B 13/02*  (2006.01)
  (Continued)

(52) U.S. Cl.
  CPC ....... *G06Q 10/06393* (2013.01); *G05B 13/02* (2013.01); *G06Q 50/163* (2013.01); *G06F 3/0482* (2013.01)

(58) Field of Classification Search
  CPC ............. G06Q 10/06393; G06Q 50/06; G06Q 50/163; G06Q 10/0636; G05B 2219/2614;
  (Continued)

(56) References Cited

U.S. PATENT DOCUMENTS 5,301,109 A    4/1994 Landauer et al.
5,446,677 A    8/1995 Jensen et al.
(Continued)

FOREIGN PATENT DOCUMENTS

CN    101415011 A    4/2009
CN    102136099 A    7/2011
(Continued)

OTHER PUBLICATIONS

Yun, Jaeseok; Won, Kwang-Ho. Building Environmental Analysis based on Temperature and Humidity for Smart Energy Systems. Jul. 18, 2012.*
(Continued)

*Primary Examiner* — Johnna R Loftis
(74) *Attorney, Agent, or Firm* — Foley & Lardner LLP

(57) ABSTRACT

A building system of a building includes one or more memory devices configured to store instructions that, when executed by one or more processors, cause the one or more processors to receive building data from multiple sensors in multiple areas of the building indicating operation of the building. The instructions cause the one or more processors to calculate key performance indicators (KPIs) based on the building data and compare the KPIs to the building data. The instructions also cause the one or more processors to identify a user and a persona of the user, determine a set of KPIs relevant to the user, and generate a user interface based on the persona of the user to display the KPIs. The instructions then cause the one or more processors to present details of KPIs displayed on the user interface and options for affecting components of the building to adjust the KPIs.

20 Claims, 16 Drawing Sheets

(51) Int. Cl.
*G06Q 50/163* (2024.01)
*G06F 3/0482* (2013.01)

(58) Field of Classification Search
CPC ........ G05B 23/0283; G05B 2219/2639; G05B 19/4185; G05B 13/00; G05B 13/02; H04L 12/2803; G06B 2219/2642
See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |

(56) References Cited

U.S. PATENT DOCUMENTS

| | | |
|---|---|---|
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0177663 A1* | 7/2009 | Hulaj ..................... G06F 9/451 |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1* | 11/2010 | Hedley .................. G06Q 50/06 |
| | | 702/60 |
| 2010/0324962 A1* | 12/2010 | Nesler ............... G06Q 10/0637 |
| | | 705/7.36 |
| 2011/0004350 A1* | 1/2011 | Cheifetz .................. F24F 11/30 |
| | | 340/870.02 |
| 2011/0015802 A1 | 1/2011 | Imes |
| 2011/0047418 A1* | 2/2011 | Drees ................. H02J 13/0062 |
| | | 714/57 |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisenale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2014/0336786 A1* | 11/2014 | Asenjo ..................... G06F 3/048 |
| | | 700/17 |
| 2014/0358645 A1* | 12/2014 | Ehrman ........... G06Q 10/06393 |
| | | 705/7.39 |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0370927 A1* | 12/2015 | Flaherty .................. F24F 11/30 |
| | | 703/1 |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0274553 A1* | 9/2016 | Strohmenger ......... G05B 17/02 |
| 2016/0313023 A1* | 10/2016 | Przybylski ......... G05B 23/0297 |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1* | 2/2017 | Warner .................... G06Q 50/06 |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |

(56) References Cited

U.S. PATENT DOCUMENTS

| | | |
|---|---|---|
| 2017/0076263 A1* | 3/2017 | Bentz .................. F24F 11/38 |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0329499 A1* | 11/2017 | Rauschenbach .... G06F 3/04845 |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0102954 A1* | 4/2018 | Schubert .................. H04L 12/28 |
| 2018/0114140 A1 | 4/2018 | Chen et al. |
| 2018/0123909 A1* | 5/2018 | Venkitapathi .......... H04L 43/16 |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0196402 A1* | 7/2018 | Glaser .................. G05B 19/042 |
| 2018/0198627 A1 | 7/2018 | Mullins |
| 2018/0203961 A1 | 7/2018 | Aisu et al. |
| 2018/0231967 A1* | 8/2018 | Cohen ................ G05B 23/0208 |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0293038 A1* | 10/2018 | Meruva .................. G06F 3/0481 |
| 2018/0336785 A1 | 11/2018 | Ghannam et al. |
| 2018/0359111 A1 | 12/2018 | Harvey |
| 2018/0364654 A1 | 12/2018 | Locke et al. |
| 2018/0373234 A1* | 12/2018 | Khalate ............... G05B 23/0229 |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0146431 A1* | 5/2019 | Nayak ................... G05B 15/02 700/276 |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0163213 A1* | 5/2019 | Ostrye .................. F24F 11/65 |
| 2019/0268178 A1 | 8/2019 | Fairweather et al. |
| 2019/0310979 A1 | 10/2019 | Masuzaki et al. |
| 2020/0084119 A1* | 3/2020 | Zackariya ............... G06F 9/546 |
| 2020/0226156 A1 | 7/2020 | Borra et al. |
| 2020/0226524 A1* | 7/2020 | Bhattacharya .......... G06F 21/31 |
| 2020/0285203 A1* | 9/2020 | Thakur ................ G05B 13/048 |
| 2021/0042299 A1 | 2/2021 | Migliori |
| 2021/0165696 A1* | 6/2021 | Shrivastava .......... G06Q 50/10 |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

G. Suciu, T. Uşurelu and C. Jiménez, "Smart energy tools for buildings energy management," 2019 IEEE PES Innovative Smart Grid Technologies Europe (ISGT-Europe), Bucharest, Romania, 2019 (Year: 2019).*

Alvaro Corredera "An automated monitoring system for surveillance and KPI calculation" 2016 IEEE (Year: 2016).*

Balaji et al, "Brick: Metadata schema for portable smart building applications," Applied Energy, 2018 (20 pages).

(56) References Cited

OTHER PUBLICATIONS

Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).

(56) References Cited

OTHER PUBLICATIONS

Koh et al., "Plaster: An Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, First ed. published 2020 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work For Your Business: A guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Zhou, Q. et al., "Knowledge-infused and Consistent Complex Event Processing over Real-time and Persistent Streams," Further Generation Computer Systems, 2017, 76 (pp. 391-406).

\* cited by examiner

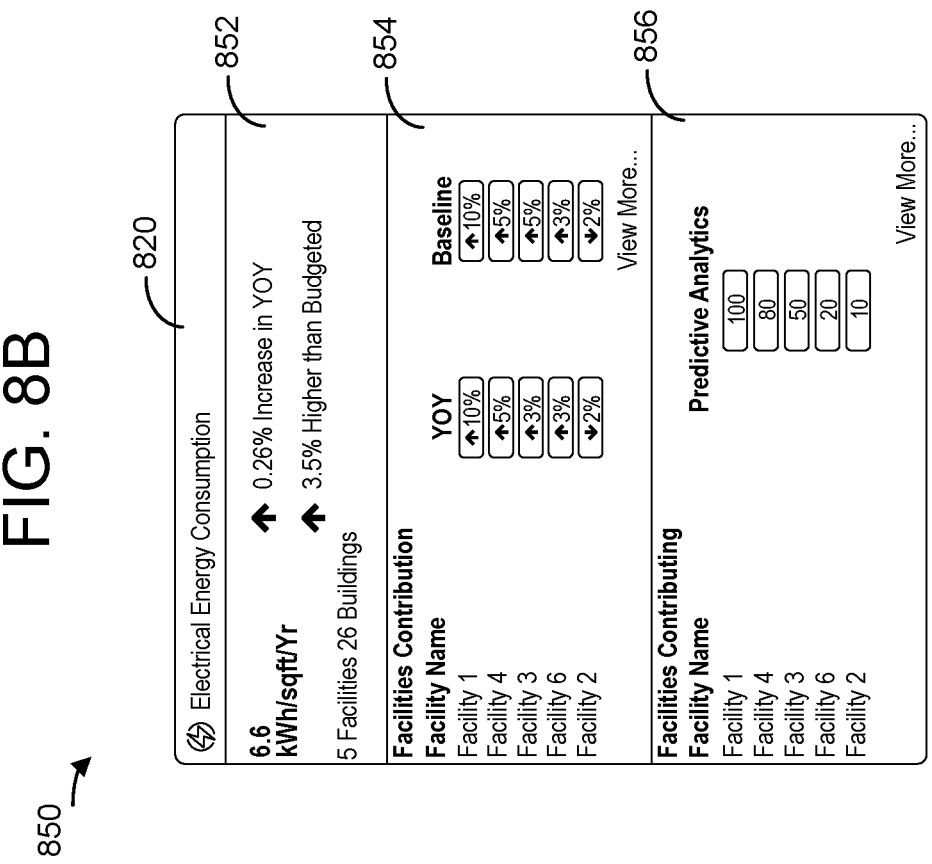

FIG. 11

| Fault Name | Meter/Space | Commodity | Occurance date | % of deviation |
|---|---|---|---|---|
| High Weekend Consumption | 2813 | Electricity | 2018-08-05 | 18.67 |
| | 2814 | Electricity | 2018-08-05 | 12.39 |
| | 2812 | Electricity | 2018-08-05 | 17.07 |

SYSTEM AND METHOD FOR SHOWING KEY PERFORMANCE INDICATORS

CROSS-REFERENCE TO RELATED PATENT APPLICATION

This application claims the benefit of and priority to U.S. Provisional Patent Application No. 62/792,347 filed on Jan. 14, 2019, the entirety of which is incorporated by reference herein.

BACKGROUND

The present disclosure relates generally to building management systems. The present disclosure relates more specifically to building management systems using key performance indicators.

Building management systems often perform a variety of functions for one or more buildings in order to affect various parameters including energy, cost, and comfort. Building management systems may also encompass different geographies and/or locations which include various differences.

Maintaining parameters within one or more buildings or areas at desired levels or within a specified range presents challenges in that data must be collected from different geographies and/or locations. Implementing building management systems is challenging in that data collected from one or more different geographies and/or locations may be influenced by variables not consistent with all geographies and/or locations.

SUMMARY

Another implementation of the present disclosure is a building system of a building. The building system including one or more memory devices configured to store instructions that, when executed by one or more processors, cause the one or more processors to receive building data from a plurality of sensors in a plurality of areas of the building, the building data indicating operation of the building, calculate key performance indicators (KPIs) based on the building data, compare, to KPI baselines and historical KPI data, the KPIs based on the building data, and identify, based on a set of user credentials, a user and a persona of the user. The instructions further cause the one or more processors to determine, based on the persona of the user, a set of KPIs relevant to the user generate a user interface based on the persona of the user, the user interface configured to display the KPIs according to the persona of the user, and present, to the user via the user interface, details of KPIs displayed on the user interface including deviation from the KPI baselines and the historical KPI data, and options for affecting components of the building such that the KPIs displayed are adjusted.

In some embodiments, the details of the KPIs displayed on the user interface include an identified area of the building for which the KPIs indicate the deviation from the KPI baselines or the historical KPI data.

In some embodiments, the details of the KPIs displayed on the user interface include an identified time for which the KPIs indicate the deviation from the KPI baselines or the historical KPI data.

In some embodiments, the details of the KPIs displayed on the user interface include identified factors causing the KPIs indicate the deviation from the KPI baselines or the historical KPI data.

In some embodiments, the KPIs calculated based on the building data for a specific area of the building are normalized to the KPIs calculated based on the building data for the building.

In some embodiments, the set of KPIs relevant to the user is based on identification of the persona of the user from a list of possible personas, with each possible persona having a corresponding set of appropriate KPIs.

In some embodiments, the instructions cause the one or more processors to calculate the KPIs based on the building data for the plurality of areas within the building, normalize the KPIs for the plurality of areas of the building, compare the KPIs for the plurality of areas of the building, and display the KPIs normalized for the plurality of areas of the building on the user interface.

In some embodiments, the user interface includes navigation to calculated analytics of the building, the analytics of the building indicating energy and equipment faults for the building.

In some embodiments, the KPIs based on the building data can be calculated for one or more specific time intervals.

In some embodiments, the details of the KPIs displayed on the user interface include changes in the KPIs since a work order was completed so as to indicate improving or worsening of the KPIs.

Another implementation of the present disclosure is a building system of a building, the building system including an enterprise management system, the enterprise management system including one or more memory devices configured to store instructions. The instructions, when executed by one or more processors, cause the one or more processors to receive enterprise data from a plurality of sensors in a plurality of areas of the building, the enterprise data indicating operation of the building, calculate key performance indicators (KPIs) based on the enterprise data, and compare, to KPI baselines and historical KPI data, the KPIs based on the enterprise data. The instructions further cause the one or more processors to identify, based on a set of user credentials, a user and a persona of the user, determine, based on the persona of the user, a set of KPIs relevant to the user, generate a user interface based on the persona of the user, the user interface configured to display the KPIs according to the persona of the user, and present, to the user via the user interface, details of the KPIs displayed on the user interface including deviation from the KPI baselines and the historical KPI data, and options for affecting enterprise equipment such that the KPIs displayed are adjusted.

In some embodiments, the details of the KPIs displayed on the user interface include an identified area of the building for which the KPIs indicate the deviation from the KPI baselines or the historical KPI data.

In some embodiments, the details of the KPIs displayed on the user interface include an identified time for which the KPIs indicate the deviation from the KPI baselines or the historical KPI data.

In some embodiments, the details of the KPIs displayed on the user interface include identified factors causing the KPIs indicate the deviation from the KPI baselines or the historical KPI data.

In some embodiments, the details of the KPIs calculated based on the enterprise data for a specific area of the building are normalized to the KPIs calculated based on the enterprise data for the building.

In some embodiments, the set of KPIs relevant to the user is based on identification of the persona of the user from a list of possible personas, with each possible persona having a corresponding set of appropriate KPIs.

In some embodiments, the instructions cause the one or more processors to calculate the KPIs based on the enterprise data for the plurality of areas within the building, normalize the KPIs for the plurality of areas of the building, compare the KPIs for the plurality of areas of the building, and display the KPIs normalized for the plurality of areas of the building on the user interface.

In some embodiments, the KPIs based on the enterprise data can be calculated for one or more specific time intervals.

In some embodiments, the details of the KPIs displayed on the user interface include changes in the KPIs since a work order was completed so as to indicate improving or worsening of the KPIs.

Another implementation of the present disclosure is a method of a building system of a building. The method includes receiving, by a processing circuit, building data from a plurality of sensors within the building, the building data indicating operation of the building, calculating, by the processing circuit, key performance indicators (KPIs) based on the building data, and comparing, by the processing circuit, to KPI baselines and historical KPI data, the KPIs based on the building data. The method further includes identifying, by the processing circuit, based on a set of user credentials, a user and a persona of the user, determining, by the processing circuit, based on the persona of the user, a set of KPIs relevant to the user, generating, by the processing circuit, a user interface based on the persona of the user, the user interface configured to display select KPIs according to the persona of the user, and presenting, by the processing circuit and via the user interface, details of the KPIs displayed on the user interface including deviation from the KPI baselines and the historical KPI data, and options for affecting components of the building such that the KPIs displayed are adjusted.

BRIEF DESCRIPTION OF THE DRAWINGS

FIG. 8B is an isolated view of a portion of the sample user interface of FIG. 8A.

FIG. 11 is a sample user interface of a BMS that provides details relating to the sample user interface of FIG. 10B.

FIG. 12 is a sample user interface of a BMS that provides details of incidents.

FIG. 13 is a sample user interface of a BMS that shows a periodically generated report.

DETAILED DESCRIPTION

Building and HVAC System

Figure 1:
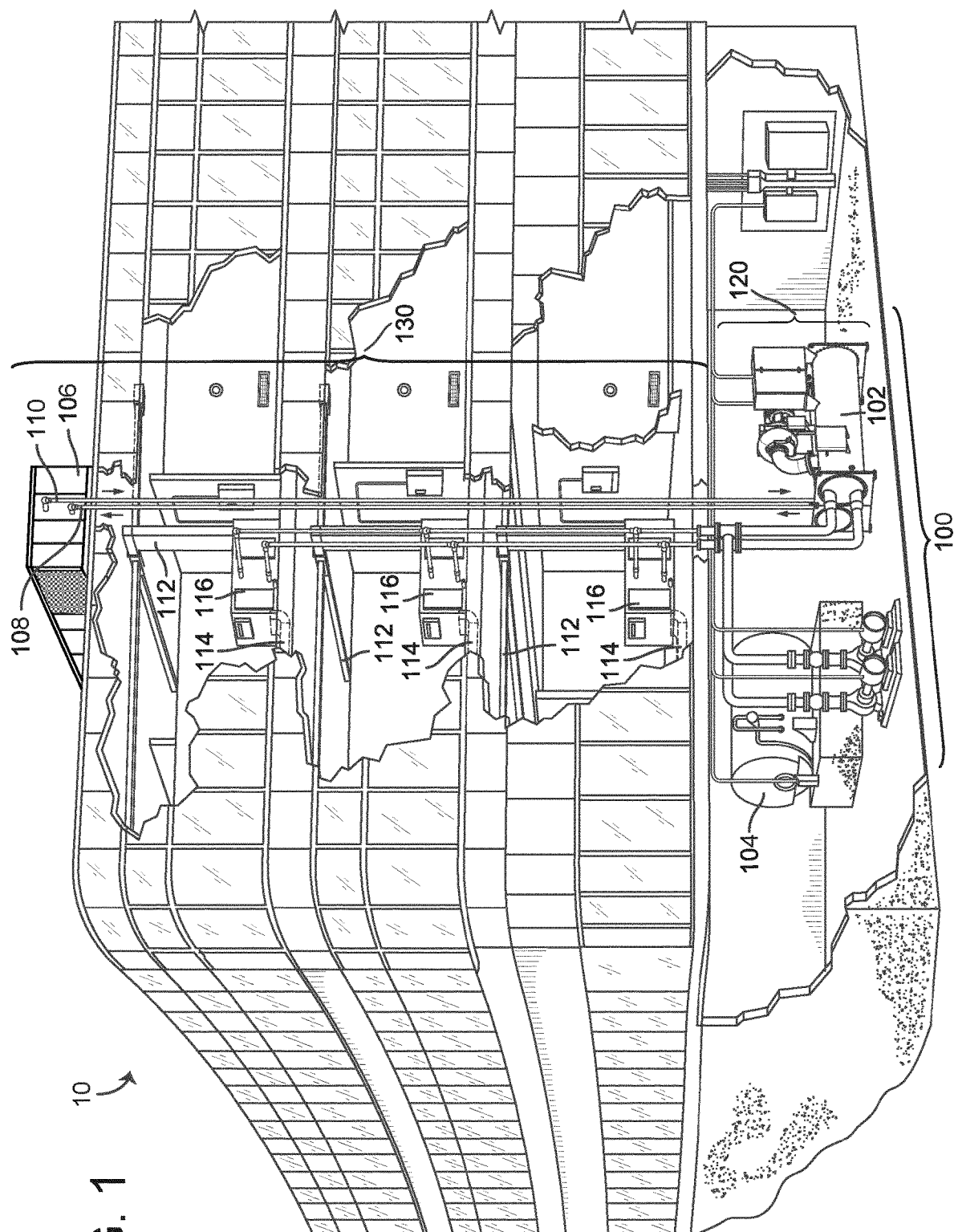
FIG. 1 is a drawing of a building equipped with a HVAC system, according to some embodiments.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
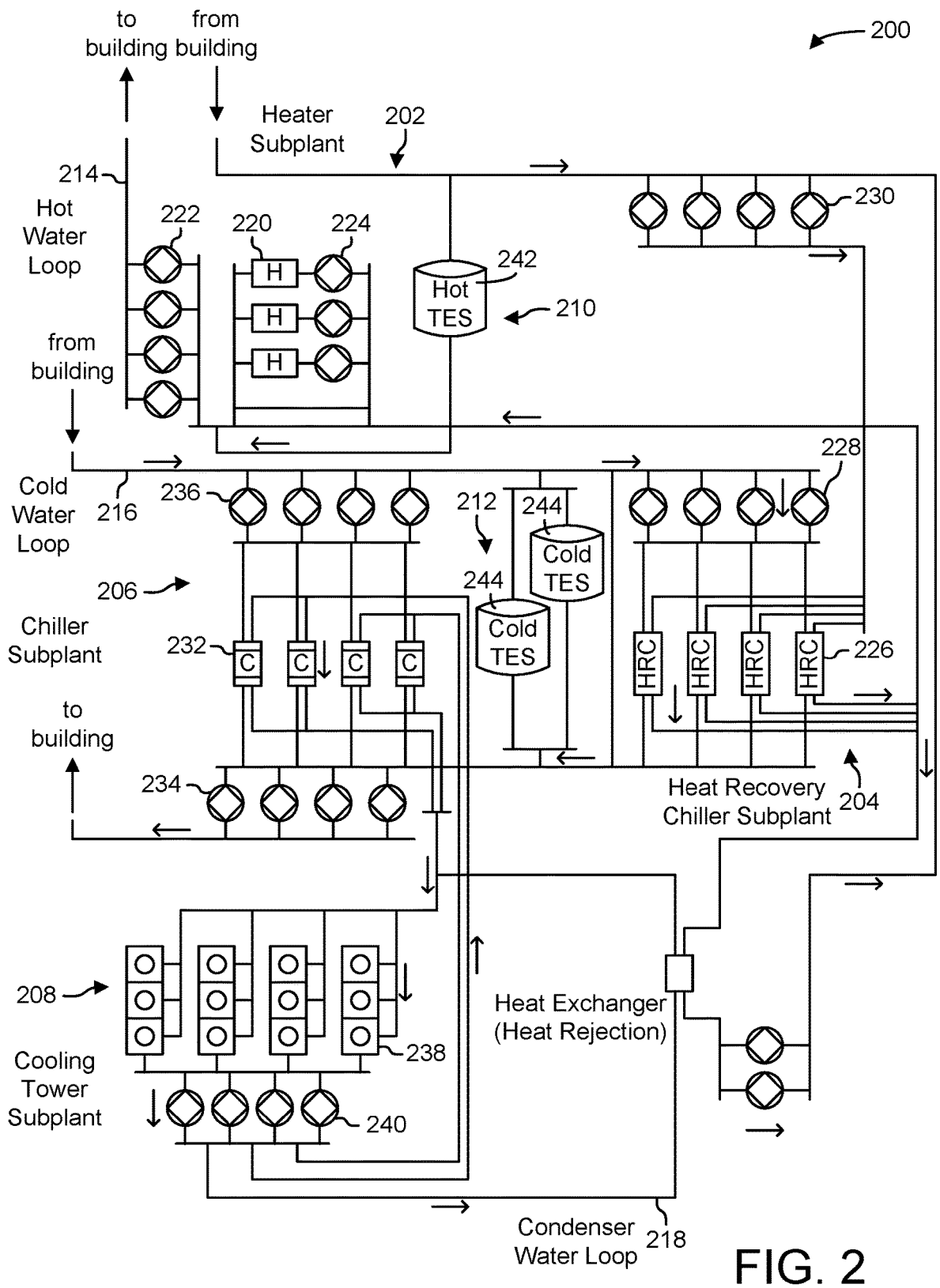
FIG. 2 is a schematic diagram of a waterside system which can be used in conjunction with the building of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
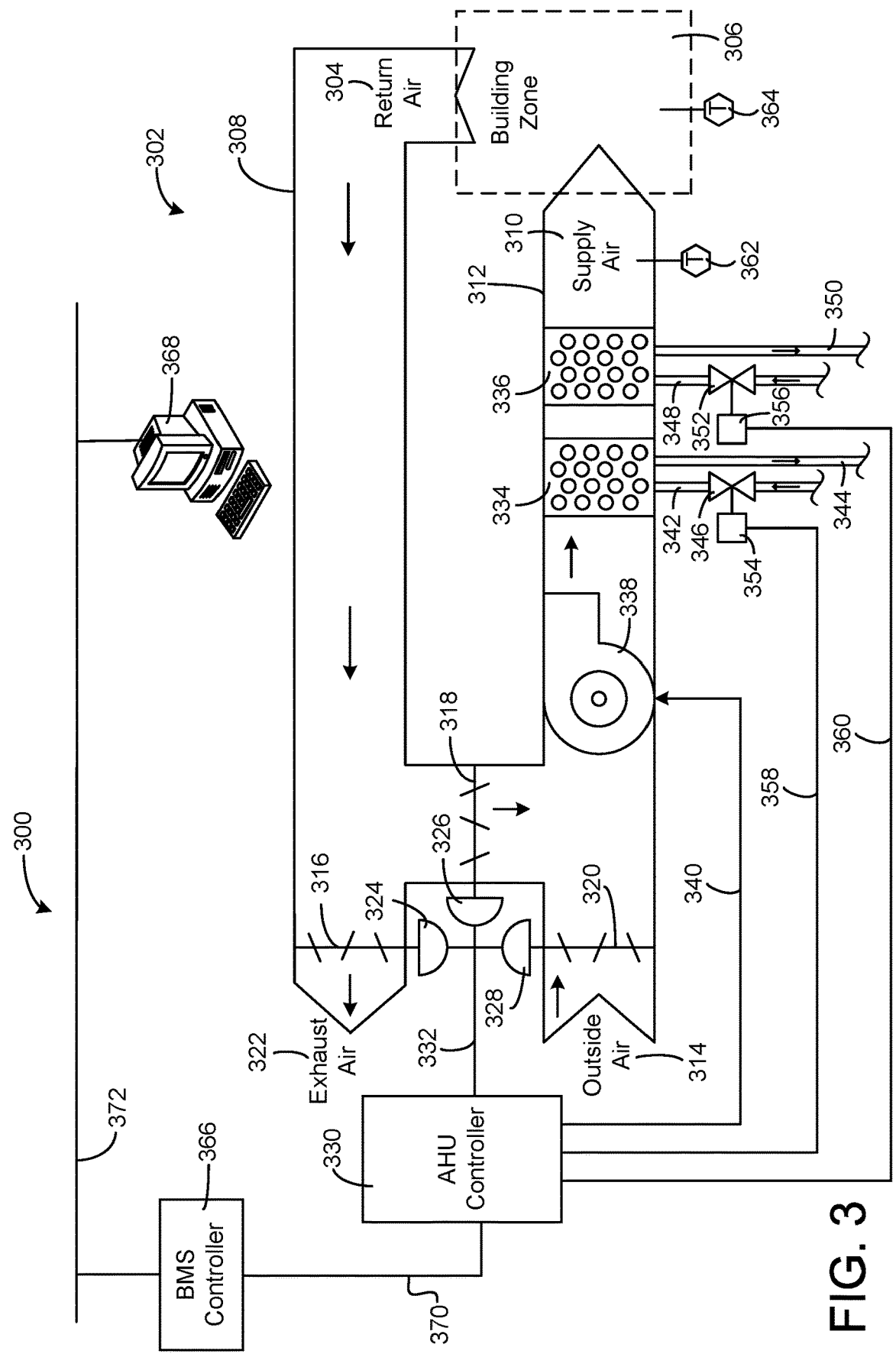
FIG. 3 is a schematic diagram of an airside system which can be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 4:
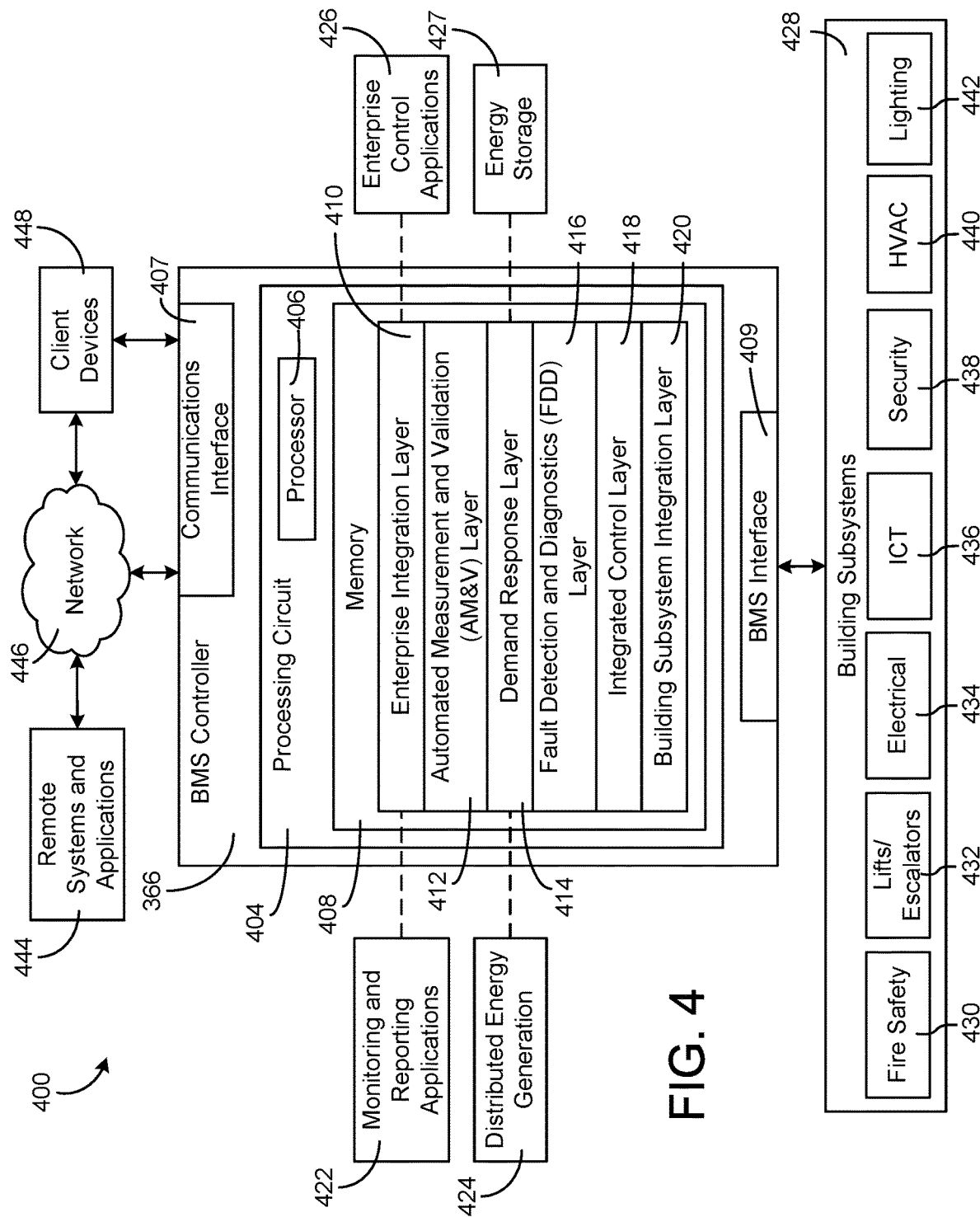
FIG. 4 is a block diagram of a building management system (BMS) which can be used to monitor and control the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
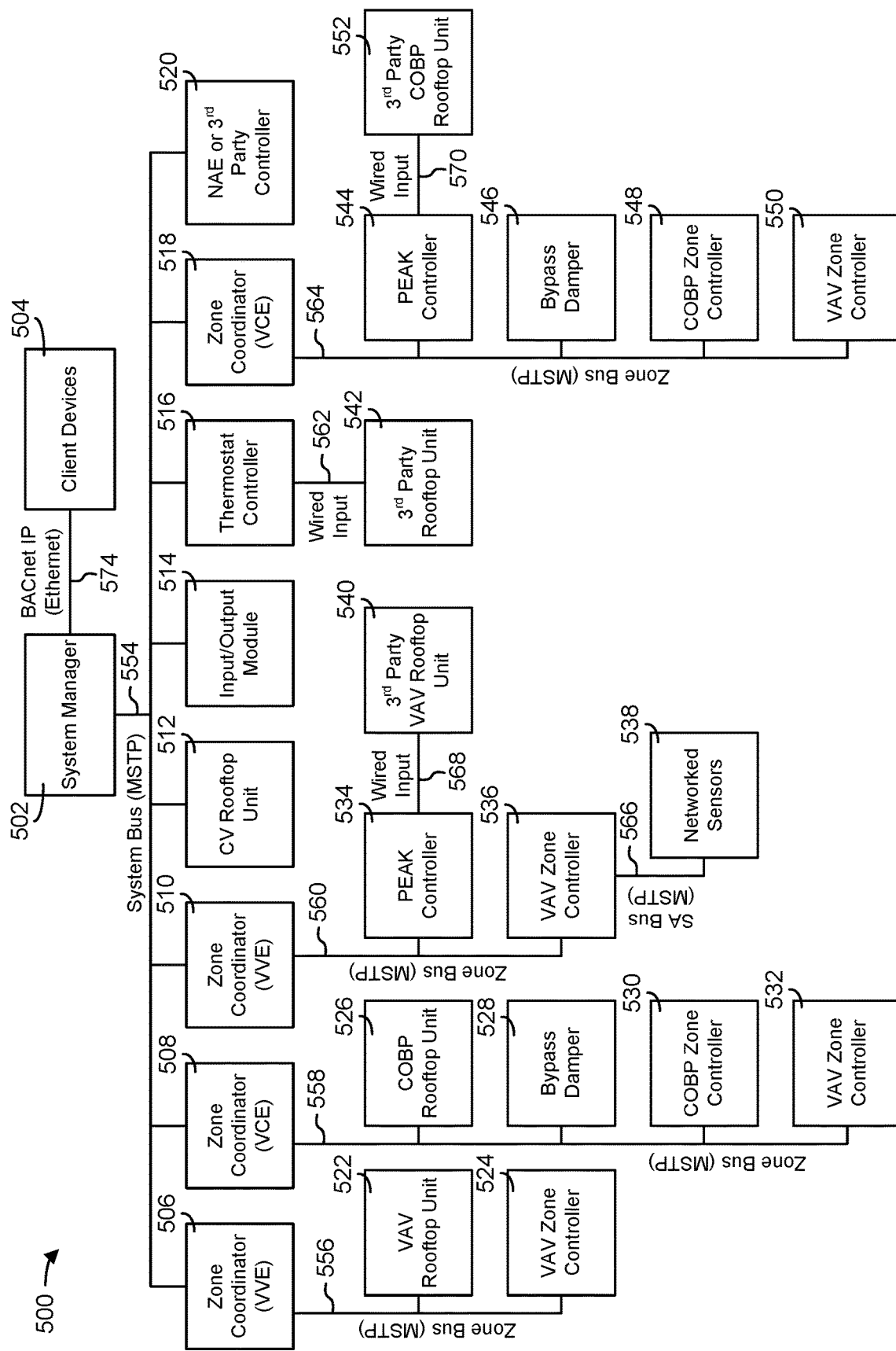
FIG. 5 is a block diagram of another BMS which can be used to monitor and control the building of FIG. 1, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Building Management System with Key Performance Indicators (KPIs)

Figure 6:
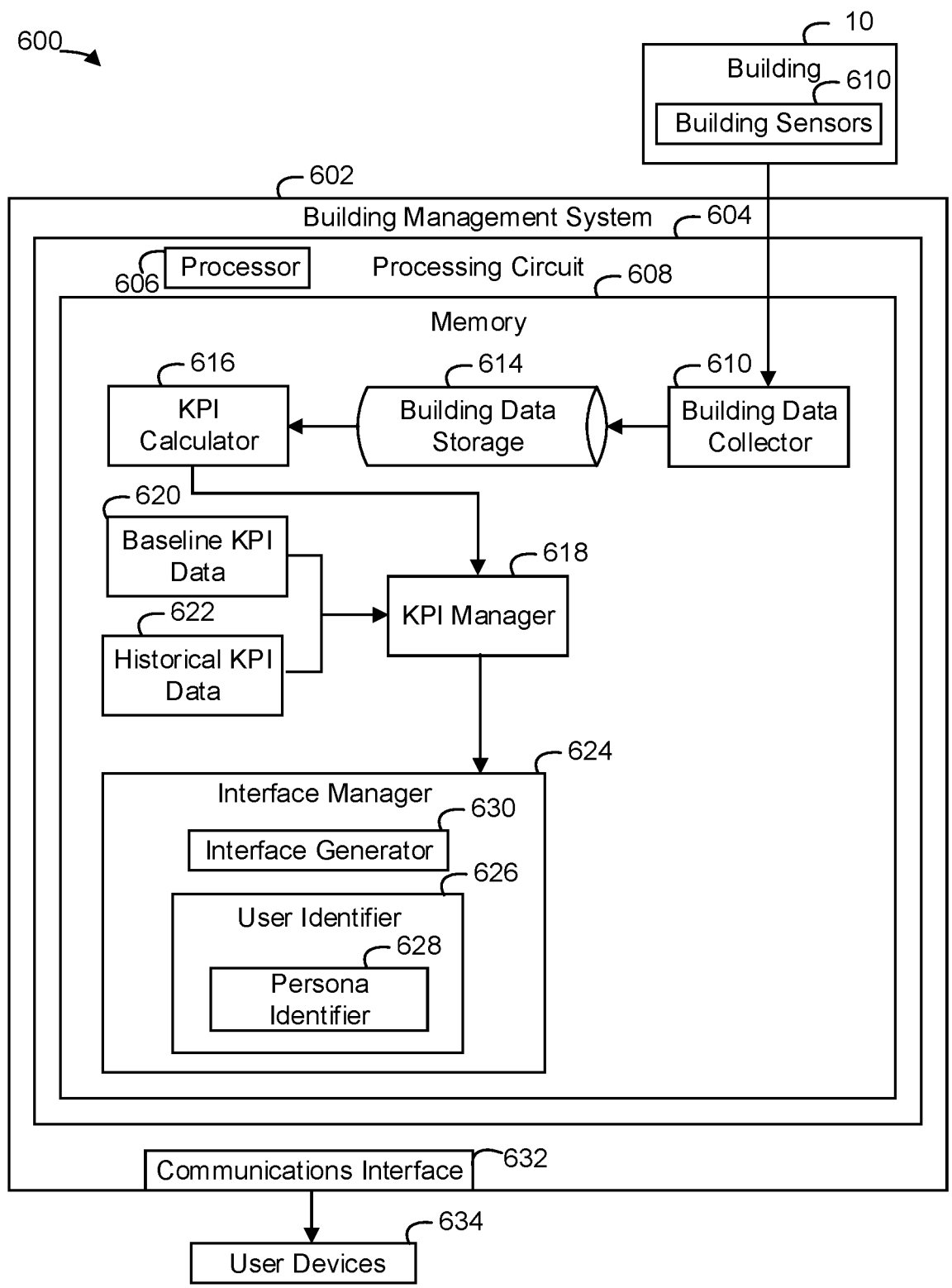
FIG. 6 is a block diagram of a building management system for calculating and managing key performance indicators, according to an exemplary embodiment.

Referring now to FIG. 6, a system 600 is shown, according to an exemplary embodiment. System 600 is shown to include a building management system 602 configured to maintain various parameters and monitor key performance indicators (KPIs) for one or more buildings. Building management system 602 is shown to communicate with building 10, which may be the same as or similar to building 10 of FIG. 1. Additionally, building management system 602 may be in communication with multiple buildings the same as or similar to building 10. System 600, including building management system 602, may interact with various equipment within building 10. For example, some equipment with which system 600 and building management system 602 communicate with may include (but is not limited to) components seen in FIG. 1 such as HVAC system 100, chiller 102, boiler 104, air handler unit 106, and waterside system 120. In some buildings such as building 10 or similar system 600 and/or building management system 602 may be in communication with one, several, or all of the systems/ equipment shown in FIG. 1, and may further be in communication with other systems/equipment not shown in FIG. 1. Building 10 is shown to include building sensors 610, as shown in the exemplary embodiment of FIG. 6. Building sensors 610 may be configured so as to collect data from various equipment within and/or adjacent to building 10, and subsequently communicate such collected data to building management system 600. For example, building 10 may include one or more air handler units the same as or similar to air handler unit 106 of FIG. 1, with said air handler unit comprising one or more building sensors 610. Building sensors 610 may be configured to collect data indicating activity and performance of the air handler unit with said collected data then communicated to building management system 602. Building sensors 610 may further be configured to collect data directly indicative of various KPIs or instrumental to the determination of KPIs.

System 600 and building management system 602 can be configured to monitor, modify, and manage various KPIs that may be critical to systems/equipment or may be of interest to a user/operator. Depending on the specifics of building 10 and/or other similar buildings, the relevant KPIs may vary. Some examples of KPIs that may be monitored, modified, and/or managed by system 600 and building management system 602 include but are in no way limited to the following: electrical energy usage intensity, thermal energy usage intensity, water consumption intensity, per capita electrical energy usage, per capita thermal energy usage, per capita water consumption, utility cost per unit area, chiller efficiency, boiler efficiency, major equipment average monthly run hours, lift under maintenance, tenant bill deviation, average meeting room utilization, average space occupies temperature, average PM 2.5 level, average monthly tenants after hours, average occupancy density, average time to respond to work orders, mean time between failures (MTBF) for all major equipment such as chillers, boiler RTUs, diesel generators, and lifts under maintenance. Again, it should be understood that the previous list of possible KPIs incorporated in the operation of system 600 and/or building management system 602 is exemplary and is in no way limiting.

Building management system 602 is shown to include a processing circuit 604, according to some embodiments. In some embodiments, processing circuit 604 is shown to include a processor 606, as well as a memory 608, as shown in the exemplary embodiment of FIG. 6. Processing circuit 604 can allow and enable communication between processor 606 and memory 608, according to some embodiments. Processor 606 can be implemented as a general-purpose processor, an application specific integrated circuit (ASIC), one or more field programmable gate arrays (FPGAs), a group of processing components, or other suitable electronic processing components.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 608 can be or include volatile memory or non-volatile memory. Memory 608 can further include database components, object code components, script components, or any other type of information structure for supporting the various activities and information structures described in the present application. According to some embodiments, memory 608 is communicably connected to processor 606 via processing circuit 604 and includes computer code for executing (e.g., by processing circuit 604 and/or processor 606) one or more processes described herein.

Memory 608 is shown to include a building data collector 612, building data storage 614, a KPI calculator 616, a KPI manager 618, baseline KPI data 620, historical KPI data 622, and an interface manager 624, as shown in the exemplary embodiment of FIG. 6. Building data collector 612 is shown to be in communication with building 10 and building sensors 610. Building sensors 610 may collect various data from various systems and/or equipment. For example, building sensors 610 may collect data pertaining to usage time, performance, efficiency, as well as other possible parameters and subsequently communicate said data to building data collector 612. In some embodiments, building data collector 612 may collect data from multiple systems and/or equipment, and may further collect data for multiple buildings such as building 10 or similar. In some embodiments, building data collector 612 may be configured to sort, organize and/or analyze data collected from building 10 and building sensors 610. For example, if a user and/or operator of system 600 preferred that data be organized by sensor of origin or organized chronologically, building data collector can organize collected data accordingly.

Memory 608 includes building data storage 614, as shown in the exemplary embodiment of FIG. 6. Building data storage is shown to be in communication with building data collector 612, which is to say that building data collector 612 may communicate collected data received from building sensors 610 to building data storage 614. Such communication between building data collector 612 and building data storage 614 may be facilitated by a wired connection, or may also occur through wireless communication means including, for example, a Bluetooth or Wi-Fi connection as well as other possible means of data communication. As indicated previously, building data collector 612 can be configured to sort or otherwise organize collected data such that data communicated to building data storage 614 may already be organized according to user/operator preference, for example. In some embodiments, building data storage 614 may be configured to store various data for various time periods and may further be configured according to user/operator preference. For example, building data storage 614 may be configured to store different amounts of data depending on the total amount of data collected from building 10 and/or other similar buildings. Additionally, various data collected from different systems and/or equipment of building 10 as well as building sensors 610 may be stored by various means within building data storage 614.

Memory 608 is shown to include KPI calculator 616, according to an exemplary embodiment. KPI calculator 616 is shown to be in communication with building data storage 614, as shown in FIG. 6. Communication between building data storage 614 and KPI calculator 616 may include data collected by building sensors 610, which has then been collected by building data collector 612 and subsequently communicated to building data storage 614 and then KPI calculator 616. KPI calculator 616 may calculate various KPIs according to various methods, with said methods dependent on a number of different factors including data communicated to KPI calculator 616 from building data storage 614, equipment and/or systems present in building 10 from which data may be collected by building sensors 610, size of building 10 and any other buildings that may be included in system 600, as well as user and/or operator preferences. For example, in the event that a user and/or operator desires KPIs calculated based on data collected from a specific time period, KPI calculator 616 may be configured to calculate various KPIs accordingly.

Additionally, different KPIs may be calculated according to different methods. For example, KPI calculators 616 may be configured to calculate various KPIs including boiler efficiency and chiller efficiency. In the event that one or more chillers for which the chiller efficiency KPI is calculated may have been down or undergone maintenance recently and thus was not functioning for a time, KPI calculator 616 may be configured to adjust the calculation of the chiller efficiency KPI accordingly, which is to say that the chiller efficiency KPI may be calculated such that downtime of one or more chillers does not impact or skew the calculation of the chiller efficiency KPI. This may be done by excluding one or more time intervals from the calculation of the chiller efficiency KPI so as to prevent data from said intervals from being incorporated in the calculation and thus influencing the calculated chiller efficiency KPI. However, in the previous example a boiler efficiency KPI may also be calculated by KPI calculator 616. In the event that one or more boilers of building 10 and system 600 did not undergo any maintenance and/or downtime similar to that described for one or more chillers, the data required for a complete and accurate calculation of boiler efficiency KPI may overlap with one or more time intervals for which data was not included in the chiller efficiency KPI calculation. As such, KPI calculator may be configured to calculate the chiller efficiency KPI using data collected from relevant periods and also calculate the boiler efficiency KPI using data from all respective relevant time periods so as to calculate accurate KPIs for both chiller efficiency and boiler efficiency. Such capability from KPI calculator 616 may allow for users and/or operators to identify performance and changes to corresponding KPIs based on specific activity of equipment and/or systems of building 10 and system 600.

KPI calculator 616 may be further configured to calculations other than those to determine various KPIs. In some embodiments, KPI calculator 616 may be configured to normalize calculated KPI values to as to provide useful KPI values for comparison to other KPI values whether calculated based on data collected elsewhere in building 10 and/or system 600 or from an additional facility and used in comparison. For example, if a KPI corresponds to a specific area and is compared to a similar KPI calculated based on data collected from a much larger or smaller area, KPI calculator may normalize the KPIs and/or the collected data so as to allow for comparison of data and calculated KPIs.

Memory 608 is also shown to include a KPI manager 618, as shown in the exemplary embodiment of FIG. 6. KPI manager 618 is shown to be in communication with KPI calculator 616, which is to say that KPI manager 618 may be configured to received calculated KPIs as well as other data from KPI calculator 616. KPI manager may be configured according to the various KPIs calculated for the equipment and/or systems that are present in building 10 and/or operating in conjunction with system 600. For example, depending on the specifics of building 10 and preferences of users and/or operators, KPI manager may be configured to function accordingly. Further to the previous example, in the event that building 10 requires more frequent and intensive monitoring of some KPIs relative to others, KPI manager may be configured in order to accommodate the most sensitive KPIs requiring more intense monitoring differently than KPIs that require more standard, infrequent monitoring, for example.

KPI manager 618 is also shown to be in communication with baseline KPI data 620 as well as historical KPI data 622, according to an exemplary embodiment. Baseline KPI data 620 may include specific ranges which may correspond to different classifications, for example. In some embodiments, baseline KPI data may include various intervals with corresponding identifiers which allow KPI manager 618 to analyze and classify calculated KPIs for different equipment and/or systems of building 10 and/or system 600. For example, KPI manager 618 may compare calculated KPIs received from KPI calculator 616 to baseline KPI data 620. Further to the previous example, KPI manager 618 may subsequently identify specific systems and/or equipment as functioning normally or abnormally based on a comparison of calculated KPI data to baseline KPI data 620. Additionally, baseline KPI data may include data collected from systems and/or equipment of building 10 via building sensors 610. Such data may include data collected under controlled conditions and verified as normal operating behavior, for example. KPI manager 618 may then be configured to incorporate such data characteristic of normal operating behavior in the analysis of calculated KPIs received from KPI calculator 616.

Additionally, KPI manager 618 is also shown to be in communication with historical KPI data 622, according to some embodiments. Historical KPI data 622 may include different quantities and types of data for various different systems and/or equipment of building 10 and/or system 600. Historical KPI data 622 may also be incorporated in the identification of one or more possible root causes for various KPI activity which may include but is not limited to abnormal rapid increases or decreases in KPI values, lack of calculated KPIs, lack of data for calculating KPIs, as well as KPI activity deviating baseline KPI data 620 and similar to patterns present in historical KPI data 622. For example, historical KPI data 622 may include data identified to be indicative of a leak in one or more chillers. In analysis of calculated KPIs received from KPI calculator 616, KPI manager 618 may identify similar data to that indicative or a leak in one or more chillers and identify the corresponding calculated KPIs. Subsequently, KPI manager 618 may then prepare a message for users and/or operators indicating the presence of KPI data that may be indicative or a leak in one or more chillers. In some embodiments, KPI manager 618 may also allow for users and/or operators to log any possible work orders that may be generated in response to abnormal KPIs such as those for potentially leaky chillers in the previous example. KPI manager 618 may then associate specific KPIs with any possible work orders, and also provide an indication of KPI activity prior to and after the work order has been completed so as to identify the success of work completed. In some embodiments, KPI manager 618 may be configured to identify and/or quantify improvements relative to changes made to one or more components of building 10 and/or system 600. It should also be noted that both baseline KPI data 620 and historical KPI data 622 may be incorporated in the identification of one or more root causes for various KPI activity.

Memory 608 is also shown to include an interface manager 624, according to the exemplary embodiment of FIG. 6. Interface manager is shown to be in communication with KPI manager 618 according to some embodiments and may be configured to receive KPI data from KPI manager 618. Such data may include calculated KPIs communicated to KPI manager 618 from KPI calculator 616 for analysis, as well as data from analysis of various KPIs such as comparisons with baseline KPI data 620 and historical KPI data 622. Interface manager 624 may be further configured to organize and format data communicated from KPI manager 618 to interface manager 624. For example, depending on building 10, system 600 and the systems and equipment operating in conjunction thereof, interface manager 624 may be configured to prioritize and otherwise prioritize various data. For example, building 10 and system 600 may include equipment for which various KPIs are calculated based on collected data. In some embodiments, specific equipment and the corresponding KPI data may be of a higher priority, for example in the event that specific has been recently repaired or replaced. As such, interface manager 624 may be configured to prioritize KPI data relevant to recently repaired and/or replaced equipment over other data to be presented.

Additionally, interface manager may be further configured according to various user and/or operator preferences. For example, if an operator prefers to identify greatest deviations in KPI data, such information may be prioritized by interface manager 624 such that it is presented to any user and/or operator before data that doesn't indicate substantial deviation of KPI data. Further to the previous example, interface manager 624 may be configured to provide alerts for specific circumstances, for example KPI data exceeding baseline KPI data 620, following patterns similar to those of historical KPI data 622, or indicating abnormal behavior or one or more systems or equipment. Such data may be prioritized and prepared for presentation to any user and/or operator according to preferences or algorithms in place.

Interface manager 624 may also be configured to generate various reports and/or models for consumption. For example, weekly reports may be generated to indicate the performance of various equipment and/or systems, with said weekly reports intended to summarize KPI data of said equipment and/or systems over the course of the week (or any other desired time period). Additionally, such reports may include comparisons to previously collected data, such as historical KPI data 622 and may further include deviation statistics for KPI data relative to baseline KPI data 620. Interface manager 624 may also be configured to generate reports indicating cooperation of various systems as well as any trends identified across one or more systems. For example, interface manager 624 may be configured to generate a report showing that a trend showing increases in KPIs indicating average occupancy density and average monthly tenants after hours may correspond to an increase in a KPI for major equipment average monthly run hours.

Interface manager 624 is further shown to include a user identifier 626, according to some embodiments. User identifier 626 may be configured to function in various ways in order to identify one or more users. In some embodiments, users may provide credentials such as a username and password, or may provide a physical aspect indicating identify such as a key fob or similar. Additionally, biometric data may be implemented in order to identify one or more users, for example fingerprint scanners or face identification algorithms as well as other possible methods. User identifier 626 may be further configured to provide security and safety for building 10 and any equipment and systems thereof, such as system 600. For example, user identifier 626 may prevent unauthorized users from gaining access to controls for any equipment and/or systems of building 10 which may present safety concerns if operated incorrectly. As such, only authorized users would be permitted various levels of access after being recognized by user identifier 626. User identifier 626 may also serve to provide a record of activity by user. For example, in the event that equipment is not functioning normally, user identifier 626 may provide a log of users who has been identified and been active within one or more systems within a set time period before and/or after said abnormal function of equipment.

User identifier 626 is shown to include a persona identifier 628, as shown in the exemplary embodiment of FIG. 6. In some embodiments, users and/or operators may be characterized as having or belonging to one or more specific personas or user classes. Various user classes may be known to have different responsibilities, specialties and training/education and as such may require information specific to those responsibilities, specialties and training/education. Additionally, different personas or user classes may be permitted to perform different operations within building 10 and/or system 600. For example, some personas may be permitted to view data relative to specific responsibilities, while other personas may be permitted to change system settings and arrange for work orders and maintenance to be performed. Different personas may allow permissions that extend beyond operation of system 600 and components of building 10. For example, models may be generated based on collected data and calculated KPIs that are presented only to management personas, such as usage data and corresponding budgetary information. Such information may not be relevant or permissible for viewing by a technician persona, for example, but is both relevant and accessible by management personas.

Persona identifier 628 may be configured to identify multiple personas, as mentioned above with exemplary personas indicated below in Table 1. Table 1 is shown to include exemplary personas, as well as exemplary needs corresponding to each person and exemplary KPIs which may be relevant to the various personas. For example, a portfolio owner may be concerned with financial aspects of building 10 and/or system 600 as well as any subsequent systems and/or equipment, whereas occupants may not have any concern with financial overviews for the building, but are instead concerned with understanding the indoor environment. As shown in Table 1 below, exemplary primary KPIs for each exemplary persona relate to the exemplary needs for each persona as may exist for a building such as building 10.

TABLE 1

Exemplary personas, needs, and primary KPIs.

| Persona | Need | Primary KPI |
|---|---|---|
| Portfolio Owner | Overview understanding of the financial & operating conditions of the portfolio to determine how the investment is performing | Facility utilization<br>Budget performance: planned vs actual operating budget (energy + maintenance)<br>Reduce the overall impact of the built environment<br>Regulatory compliance scores<br>Connected facility map with people productivity KPI's<br>Understand security threats, improve safety measures |
| Business Leader of Facility | Understand usage, environmental factors, financial performance, and productivity of the facility to determine how the facility is contributing to the mission of the organization | Meeting room utilization<br>Indoor environment (temp, humidity)<br>Budget performance<br>Efficiency drains<br>Major incidents<br>Compliance score |
| Facility Manager | Understand usage, asset performance, manage energy | Budget performance<br>Space utilization<br>Energy performance |

TABLE 1-continued

Exemplary personas, needs, and primary KPIs.

| Persona | Need | Primary KPI |
|---|---|---|
| | maintenance, tenant billing & reconciliation | Asset utilization & performance<br>Identify & act on energy inefficiencies, Utility bill reconciliation<br>Tenant billing & reconciliation<br>Transition to proactive maintenance strategies<br>Manage & Monitor indoor environment factors<br>Facility compliance sores |
| Sustainability Manager | Understand the sustainability performance and manage sustainability improvement initiatives.<br>Drive education and socialization | Sustainability score<br>Energy utilization index<br>Energy performance<br>Compliance reporting |
| Finance Manager | Understand the financial performance of the facility<br>Manage financial allocations and recoveries | Budget performance<br>Net present value of asset<br>Tenant billing and reconciliation<br>Utility bill and reconciliation |
| Occupant | Understand the indoor environment<br>Personalize local environment<br>Schedule facilities like conference rooms, labs, etc. | Meeting Room availability<br>Current temperature with ability to increase or decrease the set point |

Interface manager 624 is also shown to include an interface generator 630, according to some embodiments. Interface generator may be configured to generate one or more interfaces communicating information received from KPI manager 618. Additionally, interface generator 630 may be configured to generate multiple interfaces displaying the same or similar data, with the multiple interfaces tailored to multiple different personas such as the exemplary personas shown in Table 1 above. For example, an interface may be generated for a facility manager with said interface including a budget performance KPI such as shown in Table 1. Further to the previous example, another interface may be generated for a portfolio owner and include a budget performance KPI indicating planned vs. actual operating budget. While both interfaces of the previous example include KPIs relating to budgetary concerns, such interfaces may be generated differently according to the information that each persona is authorized to view, any prioritization of said KPIs in relation to other information displayed on the interfaces, as well as other possible factors.

Interface generator 630 may be further configured to generate interfaces in order to accommodate different personas such as those listed in Table 1. For example, an occupant may interact with a user interface mounted on a keypad fixed to a wall allowing for temperature, as well as other KPIs, to be adjusted. However, a finance manager may require an interface compatible with a personal computer, which may allow for additional detail and more advanced KPI data to be displayed relative to the occupant interface of the keypad. Interface generator 630 may be further configured to generate a variety of graphics to be consumed by various personas, with the content of said graphics tailored to specific personas. Interfaces generated by interface generator 630 may include prioritized lists with KPI data for various equipment and/or facilities, graphics showing fluctuation of various KPIs over time, as well as other possible metrics with the content of said interfaces specific to a user and/or a persona of said user.

System 600 is further shown to include a communications interface 632, as shown in the exemplary embodiment of FIG. 6. Communications interface 632 may be the same as or similar to interface 407 of FIG. 4. In some embodiments, communications interface 632 may be in communication with one or more user devices, shown in the exemplary embodiment of FIG. 6 as user devices 634. User devices 634 may be in communication with communications interface 632 via a wired or wireless connection, such as Wi-Fi, or by other means. Additionally, user devices may vary according to user and persona. For example, a portfolio owner as shown as an exemplary persona in Table 1 may interact with system 600 and building 10 via one or more computers, while an occupant may interact with system 600 and building 10 using a wall-mounted keypad or remote.

Figure 7:
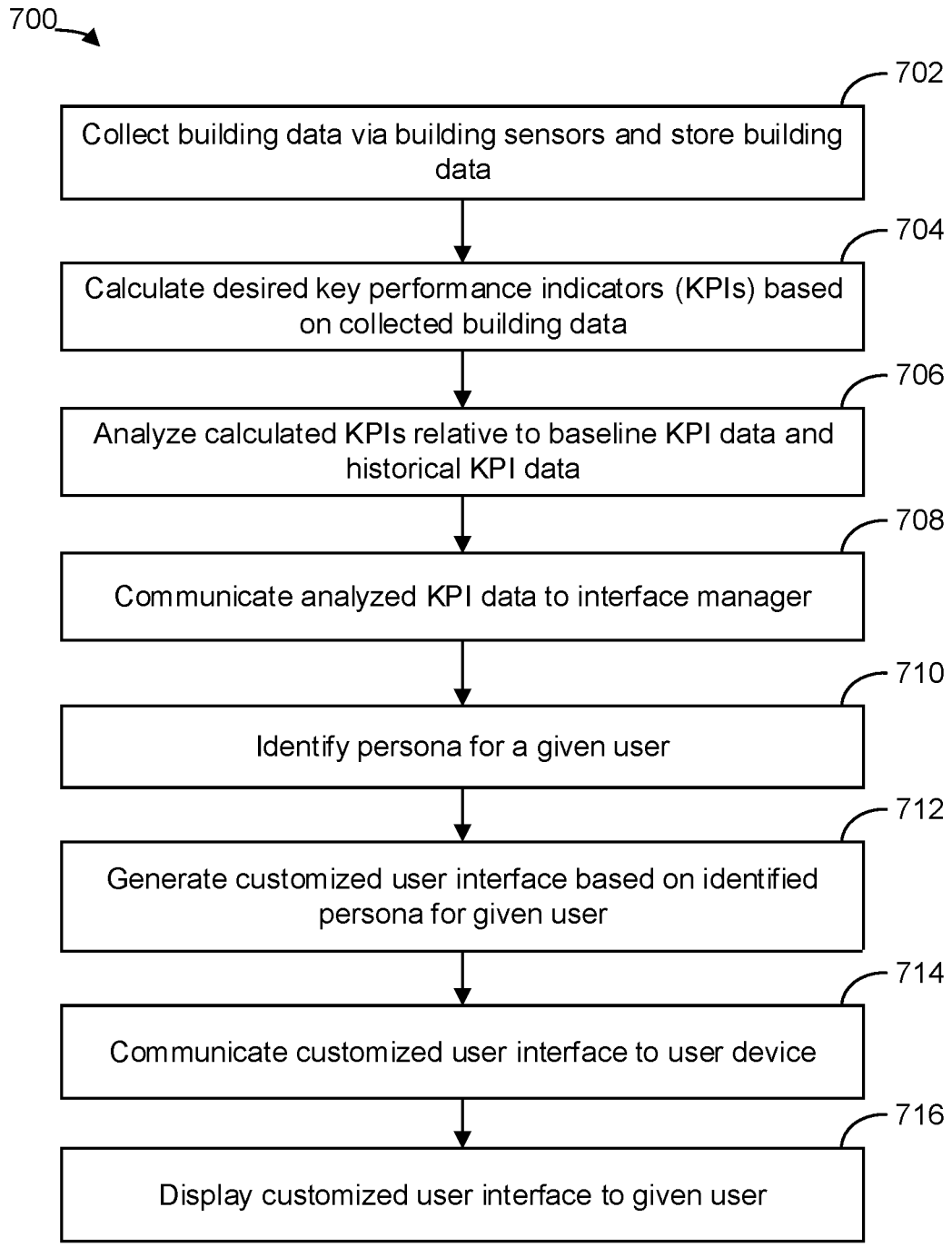
FIG. 7 is a flow diagram of a process of generating and analyzing KPIs based on data collected from building sensors that can be performed by the building management system illustrated in FIG. 6.

Referring now to FIG. 7, a process for managing KPIs 700 is shown, according to an exemplary embodiment. Process 700 and its component steps may be performed by and/or related to components of FIGS. 1-6. Additionally, process 700 may be performed iteratively and/or cyclically, with steps of process 700 possibly skipped or repeated depending on variables. It should also be noted that process 700 may be performed with additional steps or modifications to the steps thereof.

In step 702, process 700 is shown to include collecting building data via building sensors and storing building data. Step 702 may include various components of system 600 of FIG. 6A, including but not limited to building sensors 610, building data collector 612, and building data storage 614. Data collected from building data sensors may include, for example efficiency data, usage data, and output data, with said data coming from one or more time periods, according to some embodiments. Additionally, data collected may be collected from components including those seen in FIGS. 1-5 including but not limited to chillers, boilers, and air handler units (AHUs). Data collected in step 702 may further be collected in order to facilitate calculation of various KPIs, with said KPIs variable upon components as well as user and/or operator preference.

In step 704, process 700 is shown to include calculating desired KPIs based on collected building data. Step 704 may include KPI calculator 616 of FIG. 6, according to some embodiments. Step 704 may also include calculating KPIs customized to a facility and its components, and/or further customized to any user and/or operator preferences. KPIs calculated in step 704 may be done according to data collected in step 702, according to some embodiments, with KPIs potentially configured to address concerns relating to any facilities and components thereof. Step 704 may also be performed iteratively, in that as additional data is received additional KPIs may be calculated or previous KPI values may be updated.

In step 706, process 700 is shown to include analyzing calculated KPIs relative to baseline KPI data and historical KPI data. Step 706 may be performed by KPI manager 618, as shown in FIG. 6, as well as baseline KPI data 620 and historical KPI data 622. In some embodiments, step 706 may include a comparison of calculated KPI values to historical KPI values and/or baseline KPI values. Such comparison may result in determinations of deviation from a baseline, or patterns similar to historical data indicative of various concerns. Specific analyses performed in step 706 may result in generation of various alerts in place in response to various KPI values, comparisons, and deviations, for example.

In step 708, process 700 is shown to include communicating analyzed KPI data to an interface manager. Step 708 may include interface manager 624 of FIG. 6, according to some embodiments, as well as any components thereof. Step 708 may further include the preparation of various data analyzed in step 706 for presentation of a given user. For example, depending on analyses of step 708, various alerts or notifications may be prepared and specific data may be highlighted. Additionally, recommendations may be generated and documentation may be prepared, such as KPI data over various periods of time.

In step 710, process 700 is shown to include identifying a persona for a given user. Step 710 may include various methods of identification, both for a persona and for a given user, and may also incorporate user identifier 626 and persona identifier 628 of FIG. 6. For example, a user may enter credentials or provide a key fob in order to establish and verify identification. In some embodiments, biometric screening may also be incorporated, for example a fingerprint scanner or visual recognition. Step 710 may then further include identifying one or more personas corresponding to given user which may be predetermined based on position, qualifications, and other variables. For example, John Doe may enter credentials using a keypad, upon which he will be identified as a supervisor.

In step 712, process 700 is shown to include generating a customized user interface based on the identified persona for the given user. Step 712 may include interface generator 630 of FIG. 6 in order to prepare an interface customized to a given user and corresponding persona as identified in step 710. In some embodiments, this may involve adding, removing, or screening some data based on what the given user is authorized to view and needs to view in order to perform one or more assigned tasks. Additionally, step 712 may include preparing various options for the given user that may be acted upon in order to address any issues that may be presented.

In step 714, process 700 is shown to include communicating customized user interface to a user device. Step 714 may include formatting the customized user interface of step 712 to one or more preferred devices of a given user. Additionally, the customized user interface may be communicated to various user devices through various means, for example a Wi-Fi connection, a wired connection, or a Bluetooth connection, as well as other possible methods. For example, in the event that a custom user interface has been prepared for an individual with a technician persona, step 712 prepare said user interface and communicate it to a handheld device, rather than a desktop computer.

In step 716, process 700 is shown to include displaying the customized user interface to a user. In some embodiments, step 716 may include displaying the customized user interface on a single screen, while in other embodiments step 716 may include publishing the customized user interface across multiple screens. Additionally, some customized user interfaces may include an audible component, according to some embodiments. Step 716 may also present feedback options for the user, such as to confirm receipt, for example, or interactive options allowing for the user to view additional portions of the interface and/or take actions in order to address an issue or perform a task.

Figure 8A:
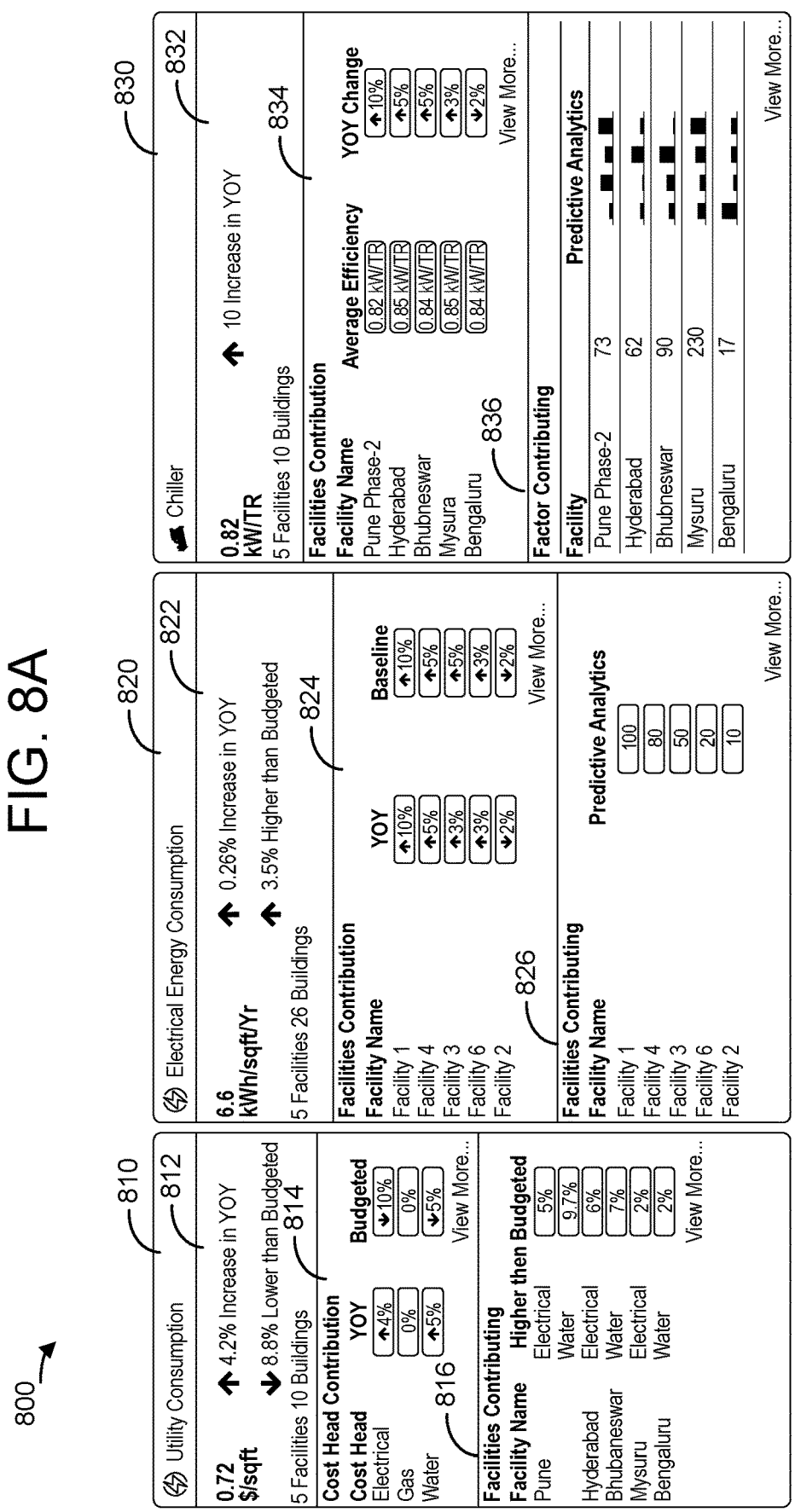
FIG. 8A is a sample user interface of a BMS that indicates usage metrics.

Referring now to FIG. 8A, a user interface 800 is shown, according to an exemplary embodiment. User interface 800 may be generated by interface generator 630 and may contain data analyzed by KPI manager 618, KPIs calculated by KPI calculator 616, all of system 600, and data collected from building sensors 610 of building 10 or similar, all of which is shown in FIG. 6. User interface 800 is shown to include a utility consumption portion 810, an electrical energy consumption portion 820, and a chiller portion 830. It should be noted that user interface 800 is exemplary and that, depending on building 10, system 600 and other factors, user interface 800 may be adapted according to equipment, systems, and KPIs that are preferred.

Utility consumption portion 810 is shown to include three sections, with said sections including a first section 812 showing efficiency, a second section 814 showing cost head contribution, and a third section 816 showing contributing facilities, according to an exemplary embodiment. First section 812 is shown to include efficiency metrics indicating cost per unit area, such as U.S. dollars per square foot, as well as a percentage increase in YOY (year over year) consumptions and an indication in terms of percentage that the indicated consumption rate is lower than budgeted. First section 812 also indicates that the data included within the section applies to five facilities and ten buildings. It should be noted that for comparisons of data across facilities, data displayed may be normalized in order to account for differences in facilities and make for comparable data. In some embodiments, such normalization may be performed by components such as KPI calculator 616 and/or KPI manager 618 of FIG. 6. Second section 814 is shown to include a breakdown of cost for three possible utilities including electrical, gas, and water, as well as similar YOY and budgeted percentage indicators. Cost head contribution section also includes an option to view more information, which may include a breakdown by facility or building, for example, such as the 5 facilities and ten buildings indicated in first section 812. Third section 816 is shown to include data for five total facilities. In some embodiments, and depending on user and/or operator preferences, the five facilities of first section 812 may be the same facilities identified in third section 816.

Electrical energy consumption portion 820 is shown to include three sections, with said sections being a fourth section 822 showing efficiency, a fifth section 824 showing facilities contribution, and a sixth section 826 showing contributing facilities, according to some embodiments. Similar to first section 812, fourth section 822 is configured to show efficiency metrics. However, fourth section 822 may display different metrics that may further be for different facilities. For example, in the exemplary embodiment of FIG. 8A, fourth section 822 indicates that five facilities and 26 buildings were taken into account in the corresponding data displayed, which is shown to indicate energy consumption per unit area per year, was well as a percentage value for YOY data and a percentage value relative to budget data. Fifth section 824 is shown to include five different facilities, as well as YOY change as a percentage and baseline as a percentage, in addition to an option to view more. It should be noted that the facilities displayed in fifth section 824 are numbered as facilities 1-4 and 6, indicating that a fifth facility may not be displayed (potentially due to how the data was displayed/sorted) and may be seen by selecting the option to view more. Sixth section 826 is shown to include facilities contributing, with facilities identified as well as a predictive analytics score for each facility. Depending on the specific attributes of the various facilities displayed, predictive analytics values displayed may include different contributing factors. For example, predictive analytics may include an indication of how closely performance of a facility aligns with predictions for said facility or may also include other predictive measures.

Chiller portion 830 is shown to include three sections, with said sections including a seventh section 832 showing efficiency, an eighth section showing facilities contribution, and a ninth section showing factors contributing, according to some embodiments. Seventh section 832 is shown to include an indication of efficiency for five facilities and ten buildings, as well as an increase in YOY data. Additionally, it should be noted that the five facilities and ten buildings of seventh section 832 may be the same as those of first section 812, or may also be separate facilities and buildings entirely. In some embodiments, user interface 800 is shown to include data for different facilities and buildings, while in some other embodiments user interface 800 may show data for collections of facilities and buildings, some of which may overlap while others display mutually exclusive collections of facilities and/or buildings. Eighth section 834 is shown to include data for various facilities as well as average efficiency metrics and YOY changes for said facilities. Facilities listed in eighth section 834 may correspond to some and/or all of those listed in third section 816, according to the exemplary embodiment of FIG. 8A. In some embodiments, facilities may be identified arbitrarily with numbers or other identifiers, while in eighth section 834 facilities are shown to be identified by geographic location. Ninth section 836 is shown to include factors contributing to other metrics that may be displayed in various sections of user interface 800, according to some embodiments. In FIG. 8A, ninth section 836 shoes facilities the same as those shown in eighth section 834, but may also be configured to display other facilities. It should be noted that ninth section 836 includes predictive analytics which may pertain to various metrics that may or may not be displayed elsewhere on the exemplary embodiment of FIG. 8A. For example, predictive analytics of ninth section 836 may correspond to efficiency metrics, consumptions metrics, as well as other possible data that may be configured elsewhere on user interface 800 or may be accessible via user interface 800, for example by an option to view more as seen under various sections of user interface 800.

FIG. 8B is shown to include a user interface 850, according to some embodiments. User interface 850 may be an alternative version, a mobile version or another possible configuration of user interface 800 of FIG. 8A. In some embodiments, selection of an option to view more for various sections of user interface 800 may allow a user to view user interface 850. It should be noted that the format of user interface 850 is similar to that of user interface 800 in that it contains a first section 852, a second section 854, and a third section 856. Depending on user preference, first section 852, second section 854, and third section 856 may be configured such that preferred and/or prioritized information is displayed for viewing.

Figure 9:
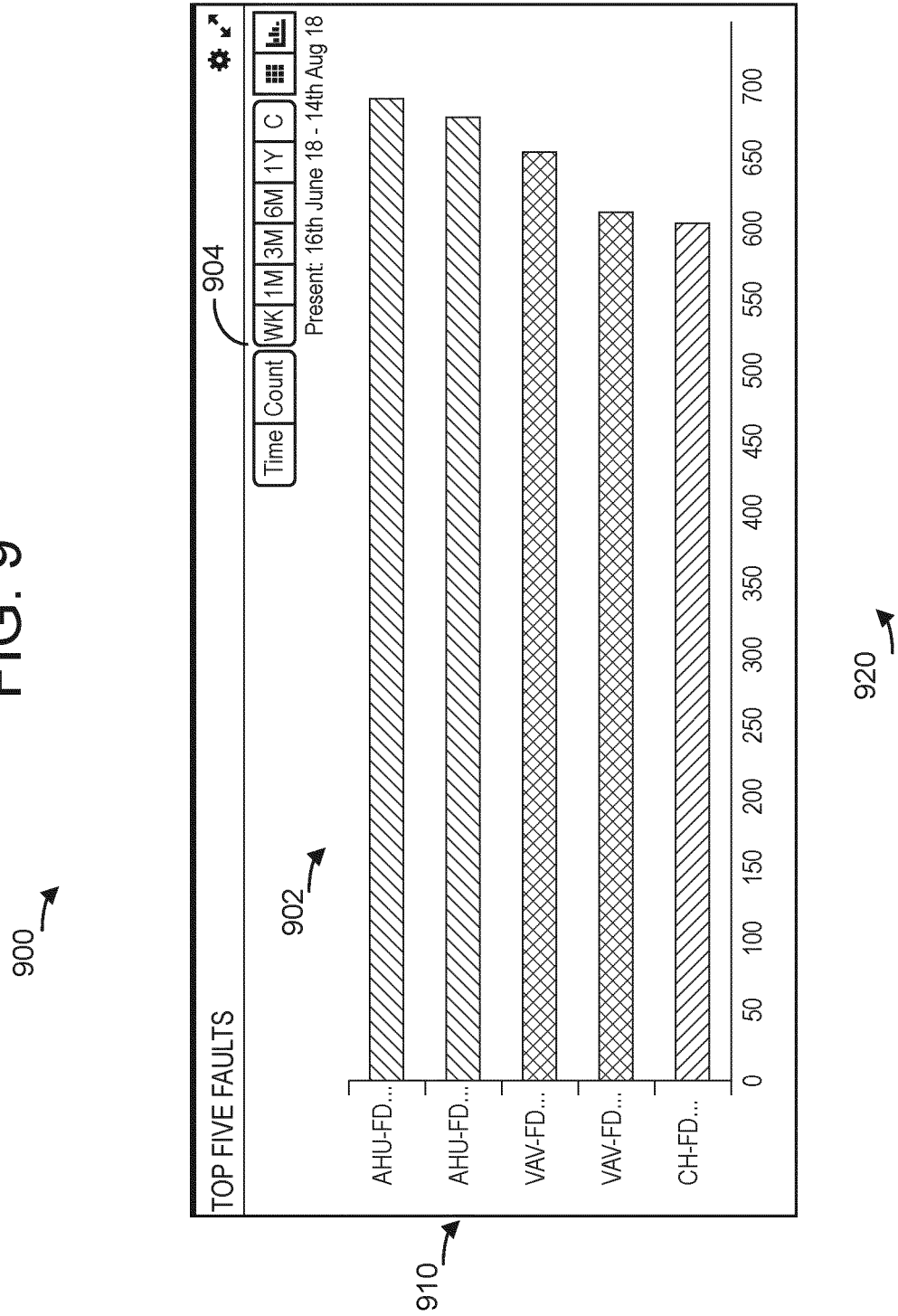
FIG. 9 is a sample user interface of a BMS that graphically shows key performance indicators (KPIs).

Referring now to FIG. 9, an additional user interface 900 is shown, according to an exemplary embodiment. User interface 900 is shown in the exemplary embodiment of FIG. 9 to display analytics for a specific building. In some embodiments, user interface 900 may be accessed via user interface 800 or user interface 850 of FIGS. 8A and 8B, respectively. User interface 900 may include a graph 902, with graph 902 providing a view of analytics for a single building. In the exemplary embodiment of FIG. 9, five faults are displayed, with said faults identified on a y-axis 910. Faults displayed and identified on y-axis 910 may include various systems or pieces of equipment that are not functioning correctly, for example. In some embodiments, user interface 900 may be configured to display specific prioritized data, such as the top five faults contributing to the maximum efficiency drain of various equipment as shown. However, user interface 900 may further be configured to display different information and/or information prioritized differently, with prioritization subject to facilities, buildings, systems, equipment, and user and/or operator preferences. User interface 900 may also include an x-axis 920, with said x-axis indicating various quantities for faults displayed, with said faults identified on y-axis 910. User interface 900 of the exemplary embodiment of FIG. 9 is further shown to include an options bar 904, positioned in the upper-right portion of user interface 900. Options bar 904 as shown in FIG. 9 may allow a user and/or operator to view different data, as well as different time periods and different formats for said data. For example, a user may be able to access alternative embodiments of user interface 900 which may include different data displayed for different time periods, according to some embodiments.

The exemplary embodiment of FIG. 9 showing user interface 900 is configured to allow a user and/or operator to not only identify energy and/or efficiency problems with equipment and/or systems, may also be configured to present causes for any such problems. In some embodiments, user interface 900 may present a root cause to a user and/or operator, with said user and/or operator equipped with information to correct any issues indicated by user interface 900. Additionally, in some embodiments user interface 900 may include an option for a user and/or operator to act upon information presented by user interface 900. Such action may include options to contact a technician or create a work order, for example, and user interface 900 may be further configured so as to allow for monitoring of any such order and notification of completion thereof. It should also be noted that user interface 900 of FIG. 9 may be configured differently than shown depending on buildings, facilities, and user and/or operator preferences as well as other variables, and may also be configured to display different content or differently formatted content than that shown in the exemplary embodiment of FIG. 9.

Figure 10A:
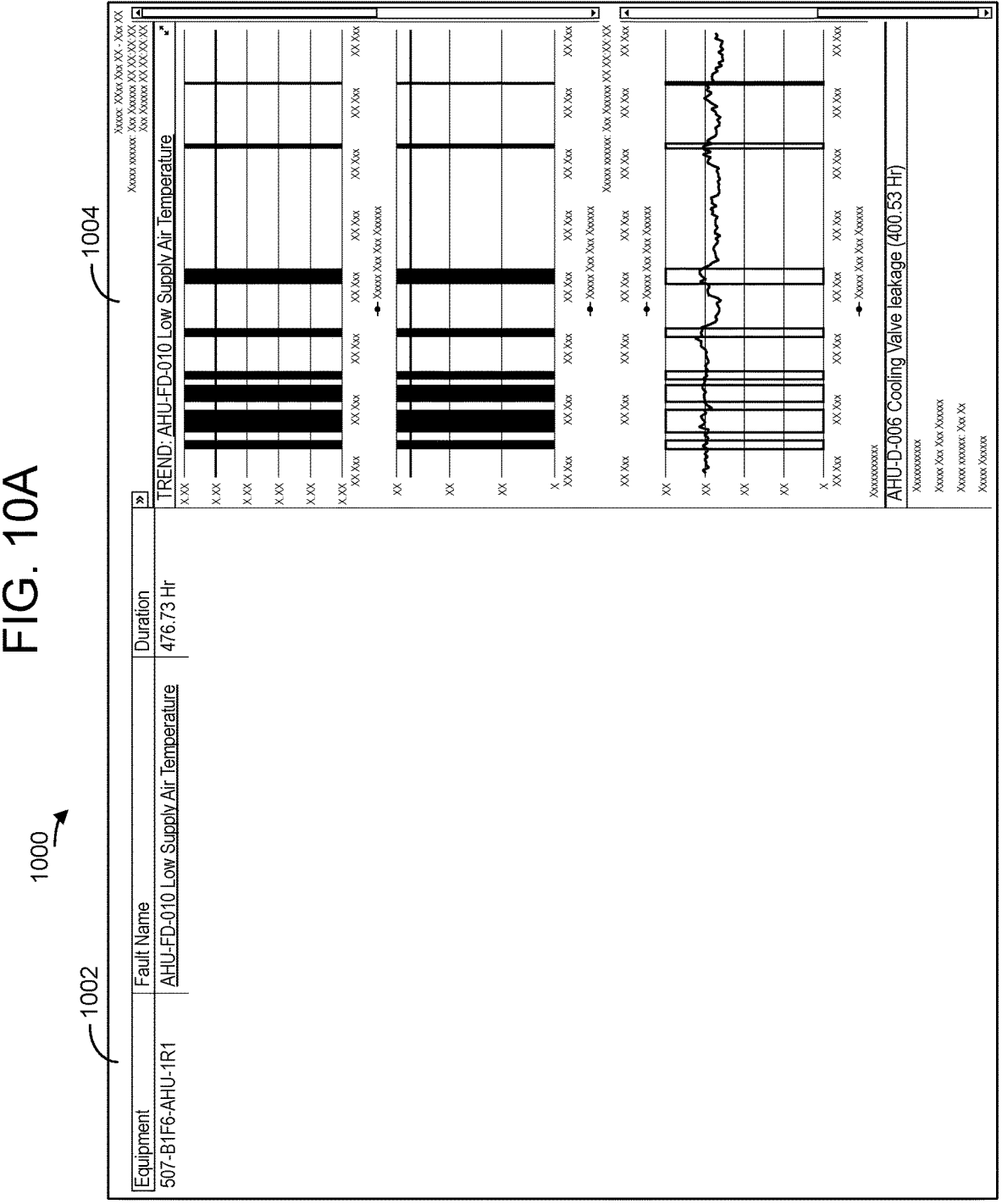
FIG. 10A is a sample user interface of a BMS that includes details of the sample user interface of FIG. 9.

Referring now to FIG. 10A, an additional user interface 1000 is shown, according to an exemplary embodiment. User interface 1000 may be configured such that a user and/or operator may be able to access user interface 1000 via user interface 900 of FIG. 9. Additionally, user interface 1000 may include details of various information initially presented in FIG. 9. User interface 1000 is shown to include a fault detail 1002. In some embodiments, user interface 1000 may include multiple fault details for one or more pieces of equipment, systems, buildings, and/or facilities. Fault detail 1002 may also include various information regarding one or more faults, with said information dependent upon embodiment user interface 1000, according to some embodiments. User interface 1000 is also shown to include a graphical portion 1004, with graphical portion 1004 shown on the right-hand portion of user interface 1000 as shown in the exemplary embodiment of FIG. 10A. As shown, graphical portion 1004 includes three graphs, although alternative embodiments of user interface 1000 may include more or fewer graphs. In the exemplary embodiment of FIG. 10A, graphical portion 1004 is shown to include graphs as well as other data relating to a fault, which in some embodiments may correspond to faults identified in fault detail 1002.

Figure 10B:
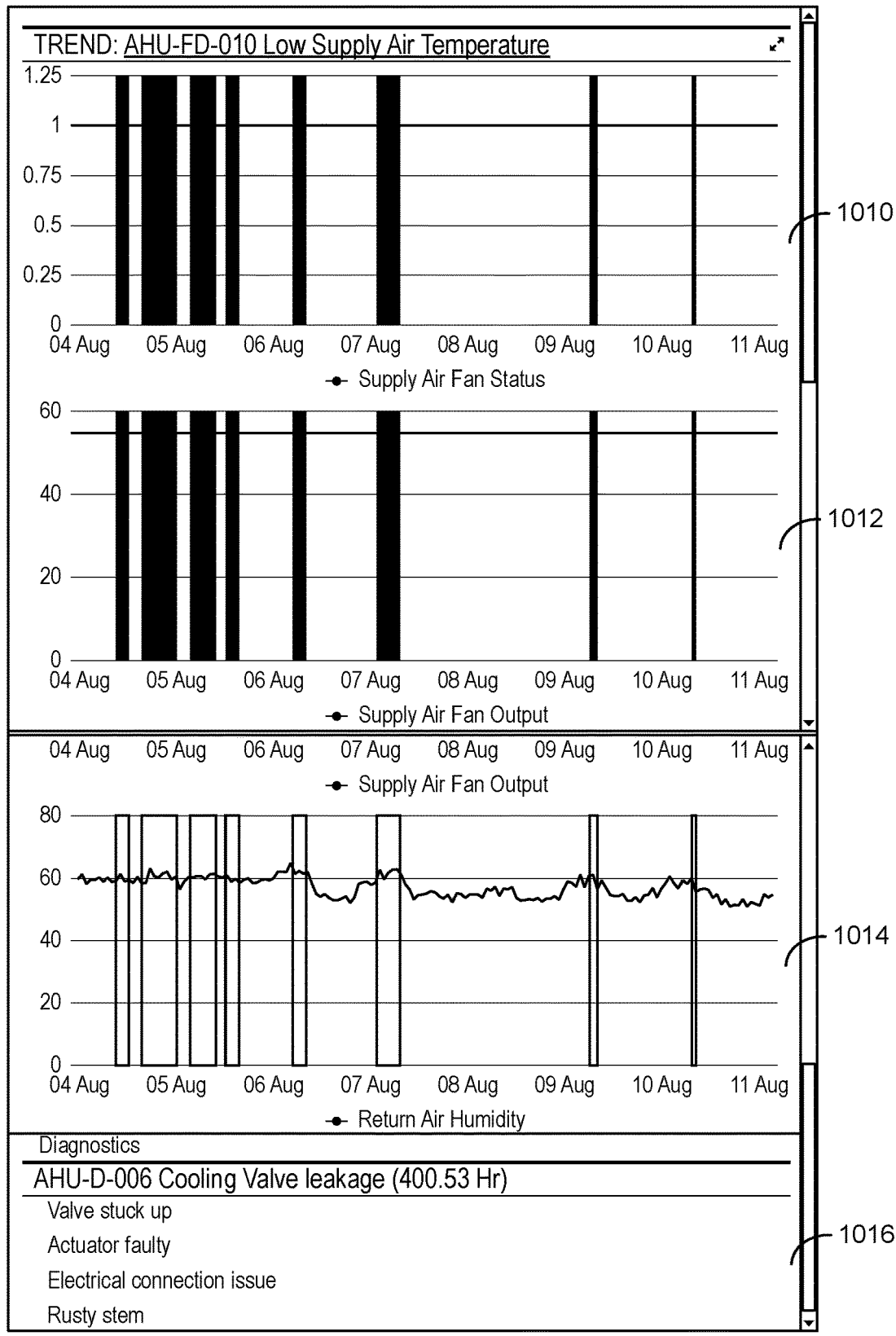
FIG. 10B is an isolated view of a portion of the sample user interface of FIG. 10A.

Referring now to FIG. 10B, graphical portion 1004 of user interface 1000 (shown in FIG. 10A) is shown in greater detail. It should be noted that, as stated above, graphical portion 1004 may contain data corresponding to one or more faults identified in fault detail 1002 of user interface 1000. In the exemplary embodiment of FIG. 10B, graphical portion 1004 is shown to include a first graph 1010, a second graph 1012, a third graph 1014, and a data section 1016. In some embodiments, first graph 1010, second graph 1012, third graph 1014, and data section 1016 may correspond to different faults present in various systems, equipment, facilities and buildings while in other embodiments the data presented in graphical portion 1004 may all correspond to a single fault. First graph 1010 is shown to indicate supply air fan status, while second graph 1012 is shown to indicate supply air fan output as shown in the exemplary embodiment of FIG. 10B. It should be noted that the x-axis of both first graph 1010 and second graph 1012 are similar, while the y-axis of first graph 1010 differs from that of second graph 1012. That is to say that various different sets of data may be compared by a user and/or operator for similar time periods. Third graph 1014 is configured to indicate return air humidity, and includes an x-axis similar to that of first graph 1010 and second graph 1012, allowing for comparison similar to that described previously between first graph 1010 and second graph 1012. Data section 1016 is shown to be positioned below third graph 1014, according to the exemplary embodiment of FIG. 10B, and may include information indicative of potential reasons for any faults that may be occurring, which may include any faults of fault detail 1002 as shown in FIG. 10A. In some embodiments, data included in data section 1016 may include options for a user and/or operator to take action, for example adjusting a setting or initiating a work order. It should also be noted that the format and data of graphical portion 1004 may vary according to some embodiments, and may be further adjustable based on user and/or operator preference, among other factors.

Referring now to FIG. 11, an additional user interface 1100 is shown, according to an exemplary embodiment. In some embodiments, user interface 1100 may be accessible via user interfaces presented in figures and describes previously, such as user interface 1000 of FIG. 10A. User interface 1100 may provide a user and/or operator with detailed data regarding operation of various systems, equipment, facilities, and buildings. User interface 1000 is shown to include a fault identity, according to the exemplary embodiment of FIG. 11. Fault identity may indicate, as shown in the example of FIG. 11, high weekend consumption but may also indicate other faults in some embodiments. Faults identified in FIG. 11 may vary in terminology. User interface 1000 is also shown to include a location identification 1104, which is shown to identify a meter/space in the exemplary embodiment of FIG. 11. In some embodiments, location identification 1104 may indicate a source of fault data, or a prediction for faulty components. User interface 1100 also includes a commodity identification 1106, which in the exemplary embodiment of FIG. 11 identifies that data being shown pertains to electricity, although one or more other commodities may be shown in various other embodiments. User interface 1100 further includes an occurrence indication 1108, as well as a deviation indication 1110. Occurrence indication 1108 may serve to identify a time, whether instantaneous or a range, to which fault data presented in user interface 1100 may correspond. Deviation indication 1110 is shown to include a percentage indicating a change from a baseline (or otherwise established normal operating conditions) which may correspond to baseline KPI data 620 of FIG. 6. It should be noted that the content of user interface 1100 may vary according to some embodiments in terms of format and data displayed, with alternative embodiments showing additional of different data to that of the exemplary embodiment of FIG. 11, with said data indicative of various KPIs.

Figure 12:
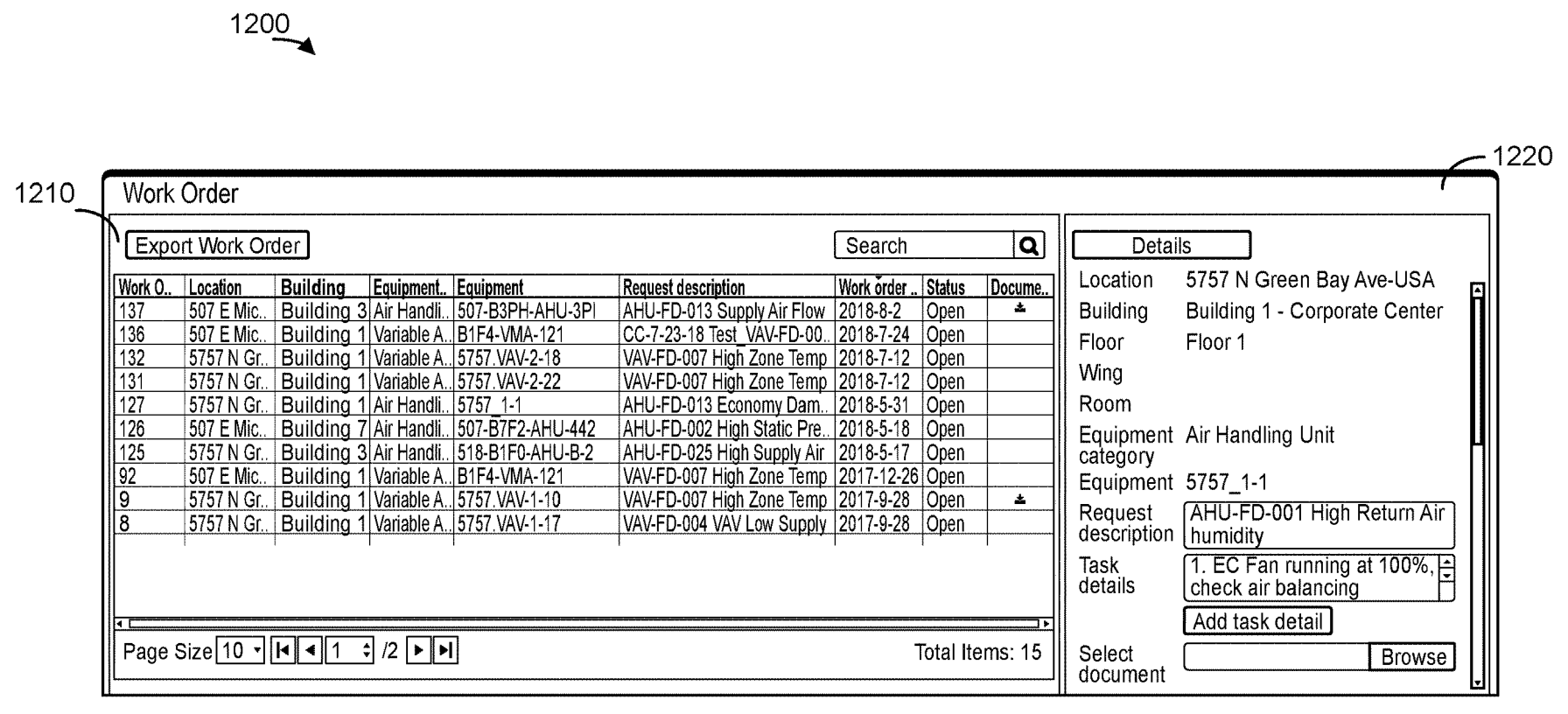

Referring now to FIG. 12, an additional user interface 1200 is shown, according to an exemplary embodiment. User interface 1200 may be accessible by a user and/or operator via previous user interfaces shown and described, for example user interface 1000 of FIG. 10A and user interface 1100 of FIG. 11. User interface 1200 is shown to include a work order list 1210, as shown on the left-hand side of user interface 1200, according to some embodiments. Work order list 1210, in the exemplary embodiment of FIG. 12, is shown to include several work orders, which each work order including various data specific to said work order. For example, as shown in FIG. 12, work order list 1210 includes a work order number, location, building, equipment identification, equipment specification, request description, work data, status, and indication of documentation. For example, a work order may be shown that is intended to repair a chiller, with said chiller's poor performance indicated by a change in one or more KPIs. In some embodiments, user interface 1200 may be configured alternatively and as such may include different or additional fields as part of work order list. It should also be noted that work order list may include navigational tools, such as buttons or other options configured to allow a user and/or operator to performs actions including viewing additional work orders (which may include previous work orders) as well as viewing various documents and exporting data. User interface 1200 is also shown to include a details section 1220, according to an exemplary embodiment, which may be configured on the right-hand portion of user interface 1200. Details section 1220 may be configured to provide details relative to one or more work orders displayed on work order list 1210. Such details provided for one or more work orders may include specific details for location, a description of any requests, as well as details for any tasks that may need to be performed. Details section 1220 may also include options to view and/or modify various documents. It should be noted that other possible configurations of user interface 1200 are possible, with said other possible configurations allowing a user and/or operator to consume data and/or interact with said data in addition to various equipment and/or systems relative to various KPIs.

Figure 13:
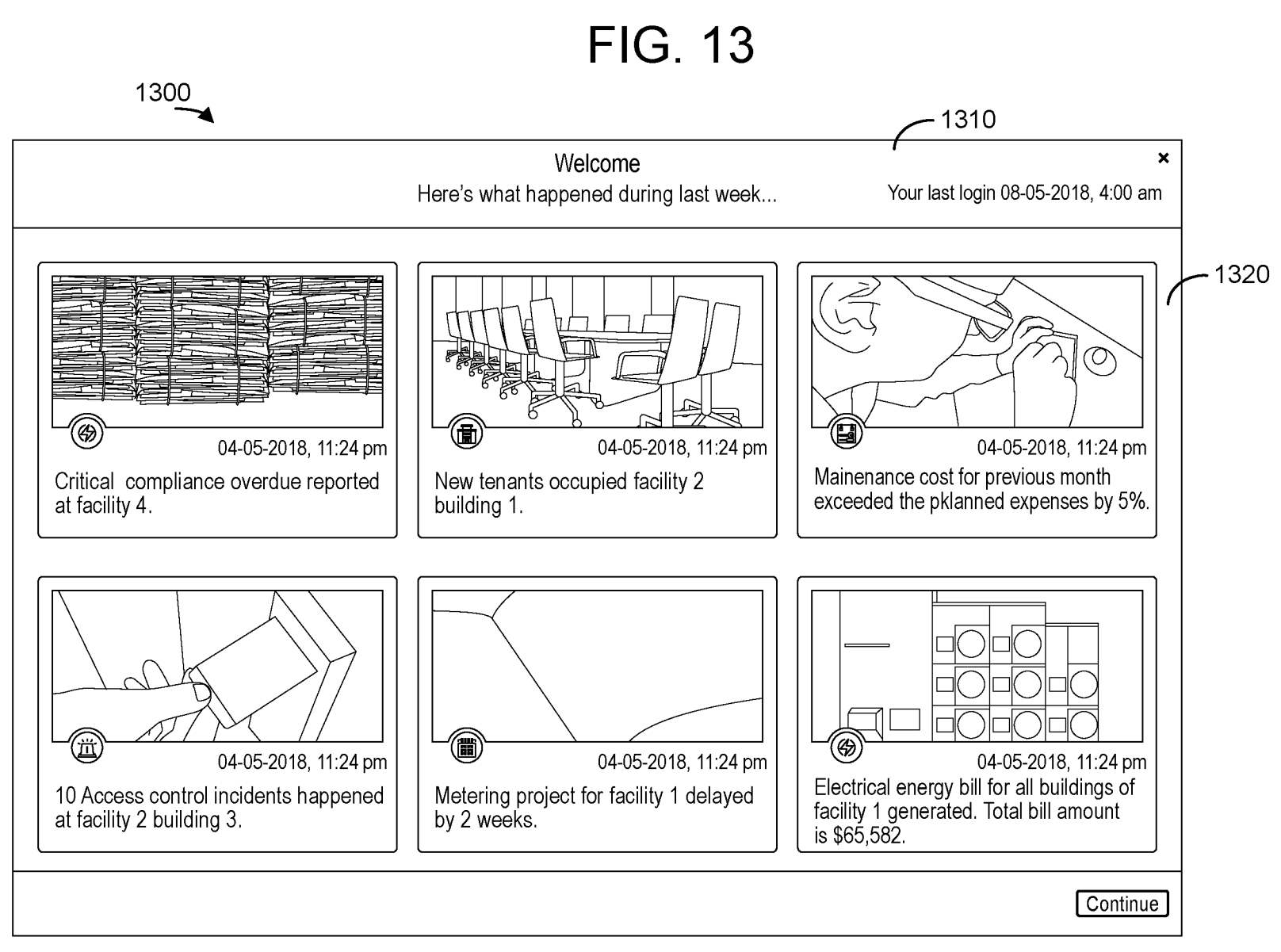

Referring now to FIG. 13, an additional user interface 1300 is shown, according to an exemplary embodiment. User interface 1300 may be accessible via one or more other user interfaces shown and described previously, or may be generated independent of other user interfaces. In some embodiments, user interface 1300 may be a report generated periodically in order to provide a high-level summary, for example, for a user in a management position. However, user interface may also be configured to provide more focused and detail-oriented content for a user in a more specialized role. User interface 1300 may also be modified according to environment which may include, for example, variables such as facilities, buildings, systems, and equipment which may be relevant as well as KPIs which may further relate.

User interface 1300 may be configured to include an introduction 1310, as shown in the exemplary embodiment of FIG. 13. In some embodiments, introduction 1310 may be configured in a top portion of user interface 1300. Introduction 1310 may be further customized according to the content of user interface 1300. For example, if user interface 1300 were displaying a generated weekly report, introduction 1310 may indicate the time period for which user interface 1300 pertains. Additional information, for example the last login of a user, as shown in FIG. 13, may also be included in introduction 1310, for example the contents of other portions of user interface 1300. User interface 1300 is further configured to include an event section 1320, as shown in the exemplary embodiment of FIG. 13. Event section 1320 may include, for example, a plurality of tiles such as the six shown that display various information. As shown in FIG. 13, event section 1320 may include summaries of various information or events, as well as brief details thereof. In the exemplary embodiment of FIG. 13, event section 1320 indicates events that occurred in the previous week, but may be modified to include more or fewer events, or to sort the events according to priority, location, or other parameters or preferences. Event section 1320 may also include options for a user and/or operator to view details of any content displayed in event section 1320 such as, in the exemplary embodiment of FIG. 13, details of an event or additional aspects of the weekly report.

Figure 14:
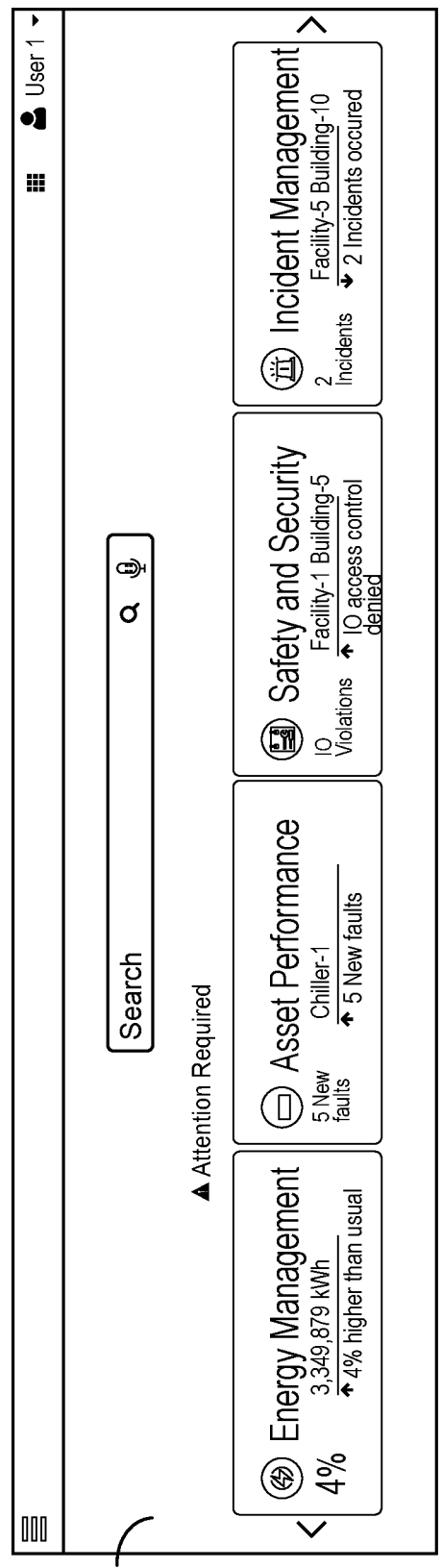
FIG. 14 is a sample user interface of a BMS that provides details relating to the sample user interface of FIG. 13.

Referring now to FIG. 14, an additional user interface 1400 is shown, according to an exemplary embodiment. In some embodiments, user interface 1400 may be accessible by a user via user interface 1300 of FIG. 13, with user interface 1400 providing details corresponding to content of user interface 1300. User interface 1400 is shown to include a dashboard 1410, as shown in the exemplary embodiment of FIG. 14. Dashboard 1410 may be configured to display various details relevant to one or more tiles shown on user interface 1300, for example. Dashboard 1410 may be further configured to prioritize various data relating to a specific issue (such as one displayed on user interface 1300) with said data possibly including energy management, asset performance, safety and security, and incident management as well as other possible data fields. Data displayed on dashboard 1410 may be customized relative to a facility, building, system, or equipment, or may be further customized to a specific user or operator. Additionally, dashboard 1410 may be customized to a specific persona, such as an exemplary persona as indicated previously in Table 1. Dashboard 1410 may also include options for a user to view details of data presented on dashboard 1410, which may include, for example, user interfaces including those described previously such as user interface 1100 of FIG. 11. It should be noted that user interface 1400 and dashboard 1410 thereof may also be configured so as to accommodate monitoring and actuation of various KPIs, and may additionally be customized to display preferred KPIs under various circumstances.

It should be noted that all user interfaces displayed in FIGS. 8A-14 may be modified and customized according to specific facilities, buildings, systems, and/or equipment as well as to accommodate user and/or operator preference. Additionally, user interfaces of FIGS. 8A-14 may be configured to accommodate monitoring and actuation of various KPIs which may be of concern to any facilities, buildings, systems and/or equipment, or any users and/or operators thereof. Components shown in FIGS. 1-6 may also accommodated by user interfaces of FIGS. 8A-14, as well as other components common to facility, building, and enterprise management not shown. User interfaces of FIGS. 8A-14 may also be configured specific personas or user classes, such as those exemplified in Table 1 above. For example, user interface 1300 may be configured differently for a supervisor than a technician, and as such may display different information to and allow for different action to be taken by the supervisor than the technician.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain operation or group of operations.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A building system of a building, the building system comprising one or more memory devices configured to store instructions that, when executed by one or more processors, cause the one or more processors to:
receive building data from a plurality of sensors in a plurality of areas of the building, the building data indicating operation of the building;

calculate key performance indicators (KPIs) based on the building data;
compare, to KPI baselines and historical KPI data, the KPIs based on the building data;
identify, based on a set of user credentials, a user and a persona of the user;
determine, based on the persona of the user, a set of KPIs relevant to the user;
generate a user interface based on the persona of the user, the user interface configured to display a list of the set of KPIs and interactive options for affecting components of the building to adjust the set of KPIs according to the persona of the user, the list providing graphics based on the set of KPIs and other KPI metrics;
present, to the user via the user interface, details of the set of KPIs displayed on the user interface including deviation from the KPI baselines and the historical KPI data, and the interactive options for affecting components of the building to adjust the set of KPIs displayed;
automatically adjust a setting of at least one component of the building that affects at least one of the set of KPIs in response to the one or more processors detecting a deviation from the KPI baselines or the historical KPI data by transmitting an electronic control signal from the one or more processors to the at least one component of the building, the electronic control signal causing the at least one component of the building to operate in accordance with the adjusted setting to affect a measurable state or condition measured by the plurality of sensors and reflected in the KPIs based on the building data received from the plurality of sensors; and
update, via the user interface, the details of the set of KPIs to include updated values of the set of KPIs resulting from operating the at least one component of the building using the adjusted setting.

2. The building system of claim 1, wherein details of the set of KPIs displayed on the user interface include an identified area of the building for which the KPIs indicate the deviation from the KPI baselines or the historical KPI data.

3. The building system of claim 1, wherein details of the set of KPIs displayed on the user interface include an identified time for which the set of KPIs indicate the deviation from the KPI baselines or the historical KPI data.

4. The building system of claim 1, wherein details of the set of KPIs displayed on the user interface include identified factors causing the set of KPIs to deviate from the KPI baselines or the historical KPI data.

5. The building system of claim 1, wherein the KPIs calculated based on the building data for a specific area of the building are normalized to the KPIs calculated based on the building data for the building.

6. The building system of claim 1, wherein the set of KPIs relevant to the user is based on identification of the persona of the user from a list of possible personas, with each possible persona having a corresponding set of appropriate KPIs.

7. The building system of claim 1, wherein the instructions cause the one or more processors to:
calculate the KPIs based on the building data for the plurality of areas within the building;
normalize the KPIs for the plurality of areas of the building;
compare the KPIs for the plurality of areas of the building; and
display the KPIs normalized for the plurality of areas of the building on the user interface.

8. The building system of claim 1, wherein the user interface includes navigation to calculated analytics of the building, the analytics of the building indicating energy and equipment faults for the building.

9. The building system of claim 1, wherein the KPIs based on the building data can be calculated for one or more specific time intervals.

10. The building system of claim 1, wherein details of the set of KPIs displayed on the user interface include changes in the set of KPIs since a work order was completed so as to indicate improving or worsening of the set of KPIs.

11. A building system of a building, the building system comprising:
an enterprise management system, the enterprise management system comprising;
one or more memory devices configured to store instructions that, when executed by one or more processors, cause the one or more processors to:
receive enterprise data from a plurality of sensors in a plurality of areas of the building, the enterprise data indicating operation of the building;
calculate key performance indicators (KPIs) based on the enterprise data;
compare, to KPI baselines and historical KPI data, the KPIs based on the enterprise data;
identify, based on a set of user credentials, a user and a persona of the user;
determine, based on the persona of the user, a set of KPIs relevant to the user;
generate a user interface based on the persona of the user, the user interface configured to display the KPIs and interactive options for affecting components of the building to adjust the KPIs according to the persona of the user;
present, to the user via the user interface, details of the set of KPIs including deviation from the KPI baselines and the historical KPI data, and interactive options for affecting enterprise equipment to adjust the set of KPIs displayed;
automatically adjust a setting of at least one component of the building that affects at least one of the set of KPIs in response to the one or more processors detecting a deviation from the KPI baselines or the historical KPI data by transmitting an electronic control signal from the one or more processors to the at least one component of the building, the electronic control signal causing the at least one component of the building to operate in accordance with the adjusted setting to affect a measurable state or condition measured by the plurality of sensors and reflected in the KPIs based on the enterprise data received from the plurality of sensors; and
update, via the user interface, the details of the set of KPIs to include updated values of the set of KPIs resulting from operating the at least one component of the building using the adjusted setting.

12. The building system of claim 11, wherein details of the set of KPIs displayed on the user interface include an identified area of the building for which the set of KPIs indicate the deviation from the KPI baselines or the historical KPI data.

13. The building system of claim 11, wherein details of the set of KPIs displayed on the user interface include an identified time for which the set of KPIs indicate the deviation from the KPI baselines or the historical KPI data.

14. The building system of claim 11, wherein details of the set of KPIs displayed on the user interface include identified factors causing the set of KPIs to deviate from the KPI baselines or the historical KPI data.

15. The building system of claim 11, wherein the KPIs calculated based on the enterprise data for a specific area of the building are normalized to the KPIs calculated based on the enterprise data for the building.

16. The building system of claim 11, wherein the set of KPIs relevant to the user is based on identification of the persona of the user from a list of possible personas, with each possible persona having a corresponding set of appropriate KPIs.

17. The building system of claim 11, wherein the instructions cause the one or more processors to:
 calculate the KPIs based on the enterprise data for the plurality of areas within the building;
 normalize the KPIs for the plurality of areas of the building;
 compare the KPIs for the plurality of areas of the building; and
 display the KPIs normalized for the plurality of areas of the building on the user interface.

18. The building system of claim 11, wherein the KPIs based on the enterprise data can be calculated for one or more specific time intervals.

19. The building system of claim 11, wherein details of the set of KPIs displayed on the user interface include changes in the set of KPIs since a work order was completed so as to indicate improving or worsening of the KPIs.

20. A method of a building system of a building, the method comprising:
 receiving, by a processing circuit, building data from a plurality of sensors within the building, the building data indicating operation of the building;
 calculating, by the processing circuit, key performance indicators (KPIs) based on the building data;
 comparing, by the processing circuit, to KPI baselines and historical KPI data, the KPIs based on the building data;
 identifying, by the processing circuit, based on a set of user credentials, a user and a persona of the user;
 determining, by the processing circuit, based on the persona of the user, a set of KPIs relevant to the user;
 generating, by the processing circuit, a user interface based on the persona of the user, the user interface configured to display select KPIs and interactive options for affecting components of the building to adjust the select KPIs according to the persona of the user;
 presenting, by the processing circuit and via the user interface, details of the set of KPIs displayed on the user interface including deviation from the KPI baselines and the historical KPI data, and interactive options for affecting components of the building to adjust the set of KPIs displayed;
 automatically adjusting a setting of at least one component of the building that affects at least one of the set of KPIs in response to the one or more processors detecting a deviation from the KPI baselines or the historical KPI data by transmitting an electronic control signal from the processing circuit to the at least one component of the building, the electronic control signal causing the at least one component of the building to operate in accordance with the adjusted setting to affect a measurable state or condition measured by the plurality of sensors and reflected in the KPIs based on the building data received from the plurality of sensors; and
 updating, by the processing circuit and via the user interface, the details of the set of KPIs to include updated values of the set of KPIs resulting from operating the at least one component of the building using the adjusted setting.

\* \* \* \* \*